(12) United States Patent
Uhlmann et al.

(10) Patent No.: US 7,720,752 B2
(45) Date of Patent: May 18, 2010

(54) SYSTEM AND METHOD FOR PROVIDING A CUSTOM HEDGED ADJUSTABLE RATE MORTGAGE

(76) Inventors: Charles E. Uhlmann, 4850 Carpenter Ave., Valley Village, CA (US) 91607; Paul Joseph Brewer, 1025 E. Del Mar Blvd., Pasadena, CA (US) 91106

( * ) Notice: Subject to any disclaimer, the term of this patent is extended or adjusted under 35 U.S.C. 154(b) by 0 days.

(21) Appl. No.: 11/524,757

(22) Filed: Sep. 20, 2006

(65) Prior Publication Data

US 2007/0192226 A1    Aug. 16, 2007

Related U.S. Application Data

(60) Provisional application No. 60/718,930, filed on Sep. 20, 2005, provisional application No. 60/777,448, filed on Feb. 27, 2006, provisional application No. 60/797,963, filed on May 5, 2006.

(51) Int. Cl.
*G06Q 40/00* (2006.01)
(52) U.S. Cl. .............................. 705/38; 705/35; 705/37
(58) Field of Classification Search .................... 705/38
See application file for complete search history.

(56) References Cited

U.S. PATENT DOCUMENTS

| | | | |
|---|---|---|---|
| 5,058,009 A | 10/1991 | Yoshino et al. | |
| 5,222,019 A | 6/1993 | Yoshino et al. | |
| 5,966,700 A | 10/1999 | Gould et al. | |
| 6,049,772 A | 4/2000 | Payne et al. | |
| 6,052,673 A | 4/2000 | Leon et al. | |
| 6,622,131 B1 | 9/2003 | Brown et al. | |
| 6,938,008 B1 | 8/2005 | Stokes | |
| 7,099,843 B1 | 8/2006 | Cassidy et al. | |
| 2002/0019805 A1 * | 2/2002 | Kalotay ....................... | 705/38 |
| 2002/0046158 A1 * | 4/2002 | Kelly et al. .................... | 705/38 |
| 2002/0059136 A1 | 5/2002 | May | |
| 2002/0107789 A1 | 8/2002 | Wood | |
| 2002/0194120 A1 | 12/2002 | Russell et al. | |
| 2002/0198823 A1 | 12/2002 | Laederich et al. | |
| 2003/0028468 A1 | 2/2003 | Wong et al. | |
| 2003/0061075 A1 | 3/2003 | Heckman et al. | |
| 2003/0069821 A1 | 4/2003 | Williams | |
| 2004/0064402 A1 | 4/2004 | Dreyer et al. | |
| 2004/0122764 A1 | 6/2004 | Bilski et al. | |
| 2004/0167850 A1 * | 8/2004 | Dreyer et al. .................. | 705/38 |
| 2004/0199451 A1 | 10/2004 | Benning et al. | |

(Continued)

OTHER PUBLICATIONS

The Province, Mortgage Guarantee, Oct. 14, 1994. p. A. 52.*

(Continued)

*Primary Examiner*—Hani Kazimi
*Assistant Examiner*—Hao Fu
(74) *Attorney, Agent, or Firm*—Byrne Poh LLP

(57) ABSTRACT

Methods, media, and systems for providing a custom hedged adjustable rate mortgage are provided. These methods, media, and systems provide hedges and mortgages that may be used in conjunction with the retail mortgage sector. To facilitate these hedges and mortgages, computer systems are provided that allow a user to calculate fees, interest rates, and payments for these products based upon various factors selected by a user. The methods, media, and systems also provide a savings calculator that enables a user to determine what savings will be made be purchasing a hedge and/or mortgage under one or more scenarios.

15 Claims, 58 Drawing Sheets

U.S. PATENT DOCUMENTS

| | | | |
|---|---|---|---|
| 2004/0199457 A1 | 10/2004 | Dombroski | |
| 2005/0004860 A1 | 1/2005 | Pretell et al. | |
| 2005/0114259 A1 | 5/2005 | Almeida | |
| 2005/0278234 A1 | 12/2005 | Wagner et al. | |
| 2005/0278249 A1 | 12/2005 | Jones et al. | |
| 2006/0020532 A1 | 1/2006 | Combs | |
| 2006/0059074 A1 | 3/2006 | Freund | |
| 2006/0080202 A1 | 4/2006 | Ireland et al. | |
| 2006/0116944 A1 | 6/2006 | Perg et al. | |
| 2006/0122871 A1 | 6/2006 | Cowley et al. | |
| 2006/0136316 A1 | 6/2006 | Shiau et al. | |
| 2006/0143106 A1 | 6/2006 | Henninger et al. | |
| 2006/0149664 A1 | 7/2006 | Smyth et al. | |
| 2006/0173763 A1 | 8/2006 | O'Connor et al. | |
| 2006/0184450 A1 | 8/2006 | Ely et al. | |
| 2007/0250439 A1* | 10/2007 | Crocker | 705/38 |
| 2008/0005016 A1 | 1/2008 | Uhlmann | |

OTHER PUBLICATIONS

Stuart J Watson, Protect Against Mortgage Rate Rises, Mortgage, Jul. 2, 2008.*

Hazel Cottrell, MarketGuard Mortgage Rate Insurance -Protection or Exploitation, Jul. 8, 2008.*

Gill Montia, MarketGuard to Launch Mortgage Interest-Rate Insurance, Mar. 17, 2008.*

Sterling Savings Bank, Rate Risk Management.*

J. Chen and M. Fu, "Hedging Beyond Duration and Convexity," Proceedings of the 2002 Winter Simulation Conference, San Diego, Dec. 8-11, 2002, p. 1593-1599.p.

J. Chen, "Simulation-Based Pricing of Mortgage-Backed Securities," Proceedings of the 2004 Winter Simulation Conference, Washington, D.C. Dec. 5-8, 2004, pp. 1589-1595.

B. Hazard, "Business Count on Cray Research Systems to Gain Competitive Advantage," Cray Channels, vol. 17, No. 1, 1995, pp. 24-25.

Y. Samuelides and E. Nahum, "A Tractable Market Model with Jumps for Pricing Short-Term Interest Rate Derivatives," Quantitative Finance, vol. 1, 2001, pp. 270-283.

M. Cary and K. Holme, "Lyon Constructs a Hedge Portfolio," Corporate Cashflow, Jan. 1991, p. 47.

J. Srodes, "The Fed in the Firing Line," Sunday Telegraph (London), May 22, 1994, p. 5—Business Section.

C. Geisst, "How Futures Trading Applies to Interest Rates," Euromoney, May 1979, pp. 124-129.

J. Willoughby, "The Hedge Masters," Forbes, Feb. 22, 1998, pp. 42 & 46.

C. Friedrich, "Recent Developments," J. of Corporate Taxation, vol. 21, Iss. 2, Summer 1994, pp. 186-192.

Y. Yao et al., Toward Parallel Financial Computation: Valuation of Mortgage-Backed Securities, 1995 IEEE International Conference on Systems, Man and Cybernetics, vol. 2 of 5, Oct. 22-25, 1995, pp. 1176-1181.

R. Friedman, "At Your Fingertips," United States Banker, Jan. 1989, pp. 64 & 66.

G. Koutmos and A. Pericli, "Hedging GNMA Mortgage-Backed Securities with T-Note Futures: Dynamic versus Static Hedging," Real Estate Economics, vol. 27, iss. 3, Summer 1999, pp. 335-363.

P. Taglia, "How Mortgage Lenders Use Futures to Hedge Pipeline Risk," What Counts, Federal Home Loan Bank of Seattle, May 2004, p. 4.

L. Gibson, "Community Bank Balance Sheets," Derivatives Strategy Magazine, Aug. 1999, p. 10.

T.S. Lee et al., "A Study of Taipower's Dynamic Debt Structure," Monthly J. of Taipower's Engineering, iss. 671, Jul. 2004, pp. 112-131, (only abstract in English).

P. Levinson, "The Case for Interest Rate Futures," Bankers Monthly, vol. 97, iss. 5, May 15, 1980, p. 28, (abstract only).

"ED Plans to Launch Loan-Comparison Web Site," Student Aid News, vol. 27, iss. 1, Jan. 2000, p. 1, (abstract only).

C.S. Morris et al., "New Methods for Savings and Loans to Hedge Interest Rate Risk," Economic Review, Federal Reserve Bank of Kansas City, vol. 73, iss. 3, Mar. 1988, pp. 3-15.

D. Gatarek, "Some Remarks on the Market Model of Interest Rates," Control and Cybernetics, vol. 25, iss. 6, 1996, pp. 1233-1244.

Heather Richels, "Online Market Offers Hedging Against a Housing Bubble," New York Sun, Jun. 9, 2005, p. 12.

Erick Bergquist, "Fannie, Freddie Oppose Equal MBS Risk Weighting," American Banker, Jun. 30, 2000, vol. 165, Iss. 126, p. 11.

Steve Tytler, "Bond Market, Not the Fed, Signals Mortgage Rate Changes," The Herald, Jul. 6, 2003, p. F.1.

Jathon Sapsford and Patrick Barta, "Bong Woes Beset Funder of Thrifts; Dividend is Pulled; [1]," Wall Street Journal (Eastern Edition), Sep. 25, 2003, p. C.1.

Mitchell Pacelle, "Banks Itch to Lend, but Firms Sit Tight," Wall Street Journal (Eastern Edition), Dec. 17, 2003, p. C.1.

"Washington Mutual Adjusts Earnings Outlook for 2004; Rising Interest Rates Impact Mortgage Banking; Growth in Retail Banking & Financial Services Continues," Business Wire, Jun. 28, 2004, p. 1.

G. Christian Hill and Richard B. Schmitt, "Mortgage Bankers, Investment Houses Face Big Setback in Sharp Rate Swing," Wall Street Journal (Eastern Edition), Apr. 30, 1987, p. 1.

Evelyn Wallace, "Mortgage Securities Stripped Securities Draw Lively Investor Interest," American Banker, Jul. 5, 1988, vol. 153, Iss. 129, p. 23.

John Bussey and Gregory B. Witcher, "Detroit Thrift to Post Loss, Cites Futures," Wall Street Journal (Eastern Edition), Dec. 29, 1987, p. 1.

Laura Jereski and Mitchell Pacelle, "Commercial-Mortgage Funds Lure Investors," Wall Street Journal (Europe), Nov. 29, 1993, p. 8.

Steven Labaton, "Mortgage Refinancing Increases Risk for Banks, S&Ls; [Final Edition]," San Francisco Chronicle, Jan. 13, 1992, p. B.2.

Andrew S. Carron, "Derivative Mortgage Securities Offer Good Hedging Device If Used Carefully," American Banker, May 27, 1988, vol. 153, Iss. 104, p. 8.

M.P. Dunleavey, "Personal Business: Basic Instincts; Help! My A.R.M. Is Moving," NY Times, Jun. 4, 2005, 2 pages.

David Leonhardt, "Mortgage Rates Defy Fed and Delight Consumers," NY Times, Jun. 10, 2005, 3 pages.

Christine Haughney, "Wall Street Finds a New Gusher," Wall Street Journal, Jul. 28, 2005, p. C1.

Jesse Eisinger, "Investors Fret Mortgage Balloons Will Burst," Wall Street Journal, Jul. 27, 2005, p. C1.

Agnes T. Crane, "Vying for Bond Investors' Attention," Wall Street Journal, Jul. 25, 2005, p. C4.

Anna Bernasek, "Economic View; Hear a Pop? Watch Out," NY Times, May 29, 2005, 2 pages.

David Leonhardt and Motoko Rich, "The Trillion-Dollar Bet; Homeowners Take Risks in a Bid for Lower Mortgage Payments," NY Times, Jun. 16, 2005, 5 pages.

Karl E. Case, Robert J. Shiller, and Allan N. Weiss, "Mortgage Default Risk and Real Estate Prices: The Use of Index-Based Futures and Options in Real Estate," pp. 1-21.

Kanak Patel, "Lessons from the FOX Residential Property Futures and Mortgage Interest Rate Futures Market," Housing Policy Debate, vol. 5, Iss. 3, pp. 343-360.

Keith P. Sharp, "Mortgage Rate Insurance Pricing Under an Interest Rate Diffusion with Drift," The Journal of Risk and Insurance, pp. 34-49.

"Savings and Loans Back in Black After Five Years Low interest rates have given struggling thrifts a breather, but more failures are likely, some industry analysts predict; [All Aug. 27, 1992 Edition]," The Christian Science Monitor, Aug. 27, 1992, 3 pages.

Phil Love, "Fixed Rates—Enjoy Them While You Can; [3 Edition]," Evening Post, Wellington, New Zealand, May 31, 1996, p. 13.

Thomas E. White, "Are You In The Market for Put Options?," Credit Union Management, Mar. 1989, p. 14.

Lang Gibson, "Community Bank Balance Sheets," DerivitivesStrategy.com, Aug. 1999, 9 pages.

"How Mortgage Lenders Use Futures to Hedge Risk," Federal Home Loan Bank, What Counts Newsletter, May 2004, 5 pages.

Matthew A. Diersen, "Using a MBM Risk Calculator," Agricultural Marketing Policy Center, Montana State University, Briefing No. 27, Nov. 2001, 2 pages.

Jody Shenn, "Twisting ARMs: 10-Year Cap as Refi Deterrent," American Banker, Aug. 3, 2006, vol. 171, Iss. 148, p. 1.

Jyh-Horng Lin and Min-Li Yi, "Loan Portfolio Swaps and Optimal Lending," Review of Quantitative Finance and Accounting, 24, 2005, pp. 177-198.

"Online Lending: E*Trade Launches Online Loan Comparator," Mortgage Technology, Mar. 1, 2004, vol. 11, Iss. 2, p. 18.

James H. Johnson, "Selecting the Optimal Mortgage Loan Using True Interest Rates," The Journal of Consumer Affairs, Summer 1978, pp. 140-144.

Chris Clair, "HedgeStreet Tries to Bring Hedging to the Masses," Daily News, Jun. 6, 2005, p. 1.

Terry L. Zivney and Carl F. Luft, "Hedging Individual Mortgage Risk," Financial Services Review 8, 1999, pp. 101-115.

Eric Dash, "Where Execution Is King," NY Times, Jun. 17, 2005, p. C5.

Jenny Anderson, "The Hot Investment Flavor Now: The Super-REIT," NY Times, Jun. 17, 2005, p. C5.

"First Bank, Inc. Announces First Quarter 2005 Earnings," Business Wire, Apr. 28, 2005, p. 1.

Jody Shenn, "Where's Mortgage Risk? New Answers Emerging," American Banker, May 11, 2005, vol. 170, Iss. 90, p. 1.

"International Search Report," International Application No. PCT/US06/36627, Nov. 6, 2007, 2 pages.

"Written Opinion of the International Searching Authority," International Application No. PCT/US06/36627, Nov. 6, 2007, 3 pages.

KC Chan, G Andrew Karolyi, Francis Longstaff, and Athony B Sanders, "An Empirical Comparison of Alternative Models of the Short-Term Interest Rate," The Journel of Finance, vol. XLVII, No. 3, Jul. 1992, pp. 1209-1227.

"International Search Report", International Application No. PCT/US07/84379, May 22, 2008, 3 pages.

"Written Opinion of the International Searching Authority", International Application No. PCT/US07/84379, May 22, 2008, 5 pages.

Madura, J. et al., "Cointegration of Term Structure Premiums Across Countries", Journal of Multinational Financial Management, Nov. 1998, vol. 8, issue 4, p. 393, (abstract only).

Wiley, M. et al., "Volume Relationships Among Types of Traders in the Financial Futures Markets; Introduction and Topic Importance", Journal of Futures Markets, Feb. 1998, vol. 18, iss. 1, p. 91, (abstract only).

Diagler, R. et al., "The Impact of Trader Type on the Futures Volatility—Volume Relation", Journal of Finance, Dec. 1999, vol. 54, No. 6 (abstract only).

Koutmos, G. et al., "Hedging GNMA: Mortgage-Backed Securities with T-Note Futures" Dynamic versus Static Hedging, Real Estate Economics, Jun. 1999, vol. 27, issues 2, p. 335 (abstract only).

Office Action in U.S. Appl. No. 11/786,915, filed, Apr. 13, 2007, dated Dec. 8, 2009.

Pesnado et al., "Mortgage Rate Insurance and the Canadian Mortgage Market: Some Further Reflections," Canadian Public Policy—Analyse de Politiques, XI:1:115-117, 1985.

Capozza et al., "Mortgage Rate Insurance and the Canadian Mortgage Market*," Canadian Public Policy—Analyse de Politiques, X:3:296-304, 1984.

* cited by examiner

| CONSUMER CHARM PRODUCT | SIMILAR DERIVATIVE PRODUCTS |
|---|---|
| FIRM RATE LOCK AGREEMENT <br> AN AGREEMENT BY BOTH LENDER AND BORROWER TO SUBSTITUTE A FIXED INTEREST RATE FOR A FLOATING ARM RATE FOR A KNOWN PERIOD OF TIME. THE AGREEMENT IS FIRM IN THE SENSE THAT, ONCE ENTERED, IT CAN ONLY BE CANCELLED FOR CONSIDERATION DETERMINED BY THE PRESENT VALUE OF THE CASH FLOWS IN THE AGREEMENT. THE FIXED INTEREST RATE CAN BE FURTHER LOWERED FROM MARKET RATES IN EXCHANGE FOR AN EQUIVALENT PRESENT VALUE PAYMENT. | ONE OR MORE FIXED/FLOATING LIBOR SWAPs DETERMINING THE START AND END DATES PLUS LIBOR BASIS SWAPs BETWEEN LIBOR AND THE INDEX UNDERLYING THE LOAN |
| FLEXIBLE RATE LOCK AGREEMENT <br> AN AGREEMENT BY BOTH LENDER AND BORROWER TO SUBSTITUTE A FIXED INTEREST RATE FOR A FLOATING ARM RATE FOR A KNOWN PERIOD OF TIME. THE AGREEMENT IS FLEXIBLE IN THE SENSE THAT IT CAN BE CANCELLED BY THE BORROWER BUT CANNOT BE CANCELLED BY THE LENDER. THE OPTION TO EXIT CAN BE PART OF THE PURCHASE PRICE OF THE FLEXIBLE RATE LOCK AGREEMENT OR THE BORROWER CAN START WITH A FIRM RATE LOCK AGREEMENT AND PURCHASE THE OPTION TO EXIT LATER (AT A POSSIBLY LOWER OR HIGHER PRICE). | FIXED/FLOATING LIBOR SWAP PLUS LIBOR BASIS SWAP BETWEEN LIBOR AND THE INDEX UNDERLYING THE LOAN PLUS EITHER SWAP OPTIONS ALLOWING EXIT OF SWAP; OR SWAP OPTIONS ALLOWING ENTRY OF EXACTLY OFFSETTING SWAP; OR INTEREST RATE FLOOR OPTIONS GENERATING ENOUGH CASH IF INTEREST RATES DECLINE TO ALLOW EXITING THE SWAP OR ENTERING AN OFFSETTING SWAP |
| CHANGE OF INDEX AGREEMENT <br> AN AGREEMENT BY BOTH LENDER AND BORROWER TO ALLOW THE BORROWER ONE SUBSTITUTION AMONG PARTICULAR INDEX FORMULA IN DETERMINING THE RATE OF INTEREST ON A FLOATING RATE LOAN. | EXOTIC BASIS SWAP OPTION |
| INTEREST REBATE (FLOOR) AGREEMENT <br> AN AGREEMENT BY BOTH LENDER AND BORROWER FOR THE LENDER TO REFUND TO THE BORROWER ALL INTEREST CHARGED ON A LOAN IN EXCESS OF THE FLOATING RATE THAT WOULD HAVE OCCURRED IF THE LOAN WERE RERATED ON A MONTHLY OR OTHER FREQUENCY INSTEAD OF THE (USUALLY ANNUAL) FREQUENCY CALLED FOR IN THE STANDARD LOAN AGREEMENT. | FLOOR INTEREST RATE OPTION |
| ROLLBACK RATE AGREEMENT <br> AN AGREEMENT BY BOTH LENDER AND BORROWER FOR THE LENDER TO USE THE LOWEST OF A SPECIFIED NUMBER N (E.G., 6, 12, 24) OF THE PREVIOUS (MONTHLY) LOAN INDEX VALUES FOR DETERMINING THE ANNUAL LOAN RATE ON THE ANNIVERSARY DATE INSTEAD OF THE INDEX VALUE IN EFFECT ON THE LOAN ANNIVERSARY DATE. | LOOK BACK OR PATH-DEPENDENT EXOTIC INTEREST RATE OPTION |
| CAP OR COLLAR AGREEMENT <br> AN AGREEMENT BY BOTH LENDER AND BORROWER THAT THE FLOATING RATE OF AN ARM IS LIMITED TO BE BETWEEN AN UPPER AND LOWER VALUE FOR A KNOWN PERIOD OF TIME. THE COLLAR AGREEMENT HAS BOTH AN UPPER AND LOWER LIMIT WHEREAS THE CAP AGREEMENT HAS ONLY AN UPPER LIMIT. A MODIFICATION TO THE STANDARD BLACK-SCHOLES FORMULA CAN ALLOW FOR A LOWER PRICE, GIVEN AN IMPLIED DELINQUENCY RATE THAT RISES WITH INCREASING INTEREST RATES. | A COMBINATION OF INDEXED INTEREST RATE FLOORs AND CAPs |

FIG. 1

CHARM Rate Agreements

| | Firm | Flex | Cap |
|---|---|---|---|
| In Brief | Locks in a secondary fixed rate protection period | An option to enter into a firm rate agreement later | Floating rate with your choice of cap. Rates may float below the cap, but are capped above. |
| Non-refundable Up-front fee | Low | Moderate | Premium |
| YMF Yield Maintenance Fee upon refinance | (Lock Rate - Unknown Future Market-Based Rate) x Remainder of Lock Period | None before decision deadline. Converts to firm ymf formula if protection activated. | None! |
| Best for: | locking in a rate now without paying extra for a wait-and-see approach | protecting customers desiring a wait and see approach towards future rates | those desiring no-compromise protection from rising rates. A premium product at a premium price. |
| Downside if rates fall: | Can not be economically cancelled. Customer still locked in if rates fall. Refinancing invokes YMF. | A decision must be made on the activation deadline: convert to a firm lock or cancel. Easy for big rate moves but tricky if rates are flat. | None! Customer benefits from reduced rates. |
| Bottom line: | Low cost lock-in | Good protection with limited downside. | Premium protection in up and down markets |

CHARM Rate Agreements

| | Firm | Flex | Cap |
|---|---|---|---|
| In Brief | Locks in a secondary fixed rate protection period | An option to enter into a firm rate agreement later | Floating rate with your choice of cap. Rates may float below the cap, but are capped above. |
| Non-refundable Up-front fee | Low | Moderate | Premium |
| YMF Yield Maintenance Fee upon refinance | (Lock Rate - Unknown Future Market-Based Rate) x Remainder of Lock Period | None before decision deadline. Converts to firm ymf formula if protection activated. | None! |
| Best for: | locking in a rate now without paying extra for a wait-and-see approach | protecting customers desiring a wait and see approach towards future rates | those desiring no-compromise protection from rising rates. A premium product at a premium price. |
| Downside if rates fall: | Can not be economically cancelled. Customer still locked in if rates fall. Refinancing invokes YMF. | A decision must be made on the activation deadline: convert to a firm lock or cancel. Easy for big rate moves but tricky if rates are flat. | None! Customer benefits from reduced rates. |
| Bottom line: | Low cost lock-in | Good protection with limited downside. | Premium protection in up and down markets |

FROM FIG. 8A

Select options for quote and comparison of all CHARM types.

| Loan Amount: | $500000 |
| --- | --- |
| Fully Amortizing Schedule: | 30-years ▸ |
| Loan Start Rate: | 6.000% ▸ |
| Start-rate amortization: | 6.000% ◂ |
| First Rate Reset Date: | 6.125% ▸ zing |
| | 6.250% from today — 720 |
| Loan Reset Rate: | 6.375% |
| | 6.500% ‡‡ ▸ ** This rate is unprotected. |
| LIBOR Index: | 6.625% OR ▸ |
| Loan Reset Amortization (unprotected): | 6.750% |
| | 6.875% ing ▸ |
| Preferred CHARM rate: | 7.000% swap rates ▸ |
| CHARM amortization: | 7.125% |
| | 7.250% ing ▸ |

‡‡ 12-month LIBOR and 1-year LIBOR are equivalent terms.

Submit for rates  [Submit Query]

FIG. 8B

CHARM Rate Agreements

| | Firm | Flex | Cap |
|---|---|---|---|
| In Brief | Locks in a secondary fixed rate protection period | An option to enter into a firm rate agreement later | Floating rate with your choice of cap. Rates may float below the cap, but are capped above. |
| Non-refundable Up-front fee: | Low | Moderate | Premium |
| YMF Yield Maintenance Fee upon refinance | (Lock Rate - Unknown Future Market-Based Rate) x Remainder of Lock Period | None before decision deadline. Converts to firm ymf formula if protection activated. | None! |
| Best for: | locking in a rate now without paying extra for a wait-and-see approach | protecting customers desiring a wait and see approach towards future rates | those desiring no-compromise protection from rising rates. A premium product at a premium price. |
| Downside if rates fall: | Can not be economically cancelled. Customer still locked in if rates fall. Refinancing invokes YMF. | A decision must be made on the activation deadline: convert to a firm lock or cancel. Easy for big rate moves but tricky if rates are flat. | None! Customer benefits from reduced rates. |
| Bottom line: | Low cost lock-in | Good protection with limited downside. | Premium protection in up and down markets |

FROM FIG. 9A

Select options for quote and comparison of all CHARM types.

Loan Amount: $500000
Fully Amortizing Schedule: 30-years ▷
Loan Start Rate: 6.000% ▷
Start-rate amortization: fully-amortizing ▷ — 725
  fully-amortizing
  interest only
First Rate Reset Date: today
Loan Reset Rate: LIBOR + 2.250% ‡‡
LIBOR Index: 6-month LIBOR ▷
Loan Reset Amortization (unprotected): fully-amortizing ▷
Preferred CHARM rate: use forward swap rates ▷
CHARM amortization: fully-amortizing ▷
Submit for rates Submit Query ‡ This rate is unprotected.
‡‡ 12-month LIBOR and 1-year LIBOR are equivalent terms.

FIG. 9B

CHARM Rate Agreements

| | Firm | Flex | Cap |
|---|---|---|---|
| In Brief | Locks in a secondary fixed rate protection period | An option to enter into a firm rate agreement later | Floating rate with your choice of cap. Rates may float below the cap, but are capped above. |
| Non-refundable Up-front fee | Low | Moderate | Premium |
| YMF Yield Maintenance Fee upon refinance | (Lock Rate - Unknown Future Market-Based Rate) x Remainder of Lock Period | None before decision deadline. Converts to firm ymf formula if protection activated. | None! |
| Best for: | locking in a rate now without paying extra for a wait-and-see approach | protecting customers desiring a wait and see approach towards future rates | those desiring no-compromise protection from rising rates. A premium product at a premium price. |
| Downside if rates fall: | Can not be economically cancelled. Customer still locked in if rates fall. Refinancing invokes YMF. | A decision must be made on the activation deadline: convert to a firm lock or cancel. Easy for big rate moves but tricky if rates are flat | None! Customer benefits from reduced rates. |
| Bottom line: | Low cost lock-in | Good protection with limited downside. | Premium protection in up and down markets |

FROM FIG. 10A

Select options for quote and comparison of all CHARM types.

Loan Amount: $500000
Fully Amortizing Schedule: 30-years
Loan Start Rate: 6.000%
Start-rate amortization: fully-amortizing — 730
First Rate Reset Date: 3 Years from today
Loan Reset Rate: 6.250%**
LIBOR Index: [BOR]
Loan Reset Amortization (unprotected): [ing]
  1 Years
  2 Years
  3 Years
  4 Years
  5 Years
  6 Years
  7 Years
Preferred CHARM rate: swap rates
CHARM amortization: fully-amortizing Submit for rates    Submit Query

** This rate is unprotected.
** 12-month LIBOR and 1-year LIBOR are equivalent terms.

FIG. 10B

CHARM Rate Agreements

| | Firm | Flex | Cap |
|---|---|---|---|
| In Brief | Locks in a secondary fixed rate protection period | An option to enter into a firm rate agreement later | Floating rate with your choice of cap. Rates may float below the cap, but are capped above. |
| Non-refundable Up-front fee | Low | Moderate | Premium |
| YMF Yield Maintenance Fee upon refinance | (Lock Rate - Unknown Future Market-Based Rate) x Remainder of Lock Period | None before decision deadline. Converts to firm ymf formula if protection activated. | None! |
| Best for: | locking in a rate now without paying extra for a wait-and-see approach | protecting customers desiring a wait and see approach towards future rates | those desiring no-compromise protection from rising rates. A premium product at a premium price. |
| Downside if rates fall: | Can not be economically cancelled. Customer still locked in if rates fall. Refinancing invokes YMF. | A decision must be made on the activation deadline: convert to a firm lock or cancel. Easy for big rate moves but tricky if rates are flat. | None! Customer benefits from reduced rates. |
| Bottom line: | Low cost lock-in | Good protection with limited downside. | Premium protection in up and down markets |

FROM FIG. 11A

Select options for quote and comparison of all CHARM types.

Loan Amount: $500000
Fully Amortizing Schedule: 30-years
Loan Start Rate: 6.000%
Start-rate amortization: fully-amortizing
First Rate Reset Date: 3 Years from today
Loan Reset Rate: LIBOR + 2.250%**
LIBOR Index: LIBOR + 2.250%‡‡
 LIBOR + 2.500%‡‡
 LIBOR + 2.750%‡‡
Loan Reset Amortization (unprotected): LIBOR + 3.000%‡‡
 LIBOR + 3.250%‡‡
Preferred CHARM rate: LIBOR + 3.500%‡‡
 LIBOR + 3.750%‡‡
CHARM amortization: LIBOR + 4.000%‡‡
 LIBOR + 4.250%‡‡
 LIBOR + 4.500%‡‡
Submit for rates: LIBOR + 4.750%‡‡

735 — ** This rate is unprotected.

‡‡ 12-month LIBOR and 1-year LIBOR are equivalent terms.

FIG. 11B

CHARM Rate Agreements

| | Firm | Flex | Cap |
|---|---|---|---|
| In Brief | Locks in a secondary fixed rate protection period | An option to enter into a firm rate agreement later | Floating rate with your choice of cap. Rates may float below the cap, but are capped above. |
| Non-refundable Up-front fee | Low | Moderate | Premium |
| YMF Yield Maintenance Fee upon refinance | (Lock Rate - Unknown Future Market-Based Rate) x Remainder of Lock Period | None before decision deadline. Converts to firm ymf formula if protection activated. | None! |
| Best for: | locking in a rate now without paying extra for a wait-and-see approach | protecting customers desiring a wait and see approach towards future rates | those desiring no-compromise protection from rising rates. A premium product at a premium price. |
| Downside if rates fall: | Can not be economically cancelled. Customer still locked in if rates fall. Refinancing invokes YMF. | A decision must be made on the activation deadline: convert to a firm lock or cancel. Easy for big rate moves but tricky if rates are flat. | None! Customer benefits from reduced rates. |
| Bottom line: | Low cost lock-in | Good protection with limited downside. | Premium protection in up and down markets |

Select options for quote and comparison of all CHARM types.

| | |
|---|---|
| Loan Amount: | $500000 |
| Fully Amortizing Schedule: | 30-years ▷ |
| Loan Start Rate: | 6.000% ▷ |
| Start-rate amortization: | fully-amortizing ▷ |
| First Rate Reset Date: | 3 Years ▷ from today |
| Loan Reset Rate: | LIBOR + 2.250%** ▷ |
| LIBOR Index: | 6-month LIBOR ▷ — 740 |
| Loan Reset Amortization (unprotected): | 3-month LIBOR ▷ |
| | 6-month LIBOR ▷ |
| Preferred CHARM rate: | 12-month LIBOR** ▷ |
| CHARM amortization: | fully-amortizing ▷ |
| Submit for rates | Submit Query |

** This rate is unprotected.

** 12-month LIBOR and 1-year LIBOR are equivalent terms.

FROM FIG. 12A

FIG. 12B

CHARM Rate Agreements

| | Firm | Flex | Cap |
|---|---|---|---|
| In Brief | Locks in a secondary fixed rate protection period | An option to enter into a firm rate agreement later | Floating rate with your choice of cap. Rates may float below the cap, but are capped above. |
| Non-refundable Up-front fee | Low | Moderate | Premium |
| YMF Yield Maintenance Fee upon refinance | (Lock Rate - Unknown Future Market-Based Rate) x Remainder of Lock Period | None before decision deadline. Converts to firm ymf formula if protection activated. | None! |
| Best for: | locking in a rate now without paying extra for a wait-and-see approach | protecting customers desiring a wait and see approach towards future rates | Those desiring no-compromise protection from rising rates. A premium product at a premium price. |
| Downside if rates fall: | Can not be economically cancelled. Customer still locked in if rates fall. Refinancing invokes YMF. | A decision must be made on the activation deadline: convert to a firm lock or cancel. Easy for big rate moves but tricky if rates are flat. | None! Customer benefits from reduced rates. |
| Bottom line: | Low cost lock-in | Good protection with limited downside. | Premium protection in up and down markets |

FROM FIG. 13A

Select options for quote and comparison of all CHARM types.

Loan Amount: $500000
Fully Amortizing Schedule: 30-years
Loan Start Rate: 6.000%
Start-rate amortization: fully-amortizing
First Rate Reset Date: 3 Years from today
Loan Reset Rate: LIBOR + 2.250%  This rate is unprotected.
LIBOR Index: 6-month LIBOR ** 12-month LIBOR and 1-year LIBOR are equivalent terms.
Loan Reset Amortization (unprotected): fully-amortizing ~745
Preferred CHARM rate: fully-amortizing
 interest-only 10 years
CHARM amortization: fully-amortizing
Submit for rates: Submit Query

FIG. 13B

CHARM Rate Agreements

| | Firm | Flex | Cap |
|---|---|---|---|
| In Brief | Locks in a secondary fixed rate protection period | An option to enter into a firm rate agreement later | Floating rate with your choice of cap. Rates may float below the cap, but are capped above. |
| Non-refundable Up-front fee: | Low | Moderate | Premium |
| YMF Yield Maintenance Fee upon refinance | (Lock Rate - Unknown Future Market-Based Rate) x Remainder of Lock Period | None before decision deadline. Converts to firm ymf formula if protection activated. | None! |
| Best for: | locking in a rate now without paying extra for a wait-and-see approach | protecting customers desiring a wait and see approach towards future rates | those desiring no-compromise protection from rising rates. A premium product at a premium price. |
| Downside if rates fall: | Can not be economically cancelled. Customer still locked in if rates fall. Refinancing invokes YMF. | A decision must be made on the activation deadline: convert to a firm lock or cancel. Easy for big rate moves but tricky if rates are flat. | None! Customer benefits from reduced rates. |
| Bottom line: | Low cost lock-in | Good protection with limited downside. | Premium protection in up and down markets |

FROM FIG. 14A

Select options for quote and comparison of all CHARM types.

Loan Amount: $500000
Fully Amortizing Schedule: 30-years
Loan Start Rate: 6.000%
Start-rate amortization: fully-amortizing
First Rate Reset Date: 3 Years from today
Loan Reset Rate: LIBOR + 2.250%††
LIBOR Index: 6-month LIBOR
Loan Reset Amortization (unprotected): fully-amortizing
Preferred CHARM rate: use forward swap rates — 750
CHARM amortization: use forward swap rates
 6.000%
 6.125%
 6.250%
 6.375%
 6.500%
 6.625%
 6.750%
 6.875%
 7.000%
 7.125%
Submit for rates †† This rate is unprotected.
†† 12-month LIBOR and 1-year LIBOR are equivalent terms.

FIG. 14B

CHARM Rate Agreements

| | Firm | Flex | Cap |
|---|---|---|---|
| In Brief | Locks in a secondary fixed rate protection period | An option to enter into a firm rate agreement later | Floating rate with your choice of cap. Rates may float below the cap, but are capped above. |
| Non-refundable Up-front fee | Low | Moderate | Premium |
| YMF Yield Maintenance Fee upon refinance | (Lock Rate - Unknown Future Market-Based Rate) x Remainder of Lock Period | None before decision deadline. Converts to firm ymf formula if protection activated. | None! |
| Best for: | locking in a rate now without paying extra for a wait-and-see approach | protecting customers desiring a wait and see approach towards future rates | those desiring no-compromise protection from rising rates. A premium product at a premium price. |
| Downside if rates fall: | Can not be economically cancelled. Customer still locked in if rates fall. Refinancing involves YMF. | A decision must be made on the activation deadline: convert to a firm lock or cancel. Easy for big rate moves but tricky if rates are flat. | None! Customer benefits from reduced rates. |
| Bottom line: | Low cost lock-in | Good protection with limited downside. | Premium protection in up and down markets |

FROM FIG. 15A

Select options for quote and comparison of all CHARM types.

| Loan Amount: | $500000 |
| Fully Amortizing Schedule: | 30-years ▷ |
| Loan Start Rate: | 6.000% ▷ |
| Start-rate amortization: | fully-amortizing ▷ |
| First Rate Reset Date: | 3 Years ▷ from today |
| Loan Reset Rate: | LIBOR + 2.250%** ▷   ** This rate is unprotected. |
| LIBOR Index: | 6-month LIBOR ▷   ** 12-month LIBOR and 1-year LIBOR are equivalent terms. |
| Loan Reset Amortization (unprotected): | fully-amortizing ▷ |
| Preferred CHARM rate: | use forward swap rates ▷ |
| CHARM amortization: | fully-amortizing ▷ |
| Submit for rates | fully-amortizing / interest-only — 755 |

FIG. 15B

CHARM Rate Agreements

Rate Results for March 23

Rates based on entered data:

- Lock-In Protection Start Date: 37 months from today
- Loan Amount: $500000
- Loan Reset Rate: 6mo-LIBOR + 2.25% original loan
- Fully amortizing schedule: 30-years
- Start rate amortization: fully-amortizing
- Protected Amortization: fully-amortizing
- Loan Balance on Reset Date: $480420

↑ 1610

| | Up-front CHARM fee | | | Lock Duration (months) | Initial Rate Period | | | Revised Loan Rate Schedule for Period Shown | | | | | | | |
| | | | | | | | | Purchased CHARM Period (Green) / Floating Rate Period (Red) | | | | | | | |
| | Firm Rate | Flex Rate | Cap Rate | | Month 1-12 | Month 13-24 | Month 25-36 | Month 37-48 | Month 49-60 | Month 61-72 | Month 73-84 | Month 85-96 | Month 97-108 | Month 109-120 | Month 121-132 |
| | 0.29% $1969 | 0.62% $3089 | 0.69% $3432 | 12 | 6.000% $2998/mo | | | 7.640% $3507/mo | floating LIBOR+2.25% | | | | | | |
| | 0.42% $2113 | 1.06% $5310 | 1.18% $5900 | 24 | 6.000% $2998/mo | | | 7.650% $3511/mo | | floating LIBOR+2.25% | | | | | |
| | 0.47% $2330 | 1.52% $7583 | 1.69% $8426 | 36 | 6.000% $2998/mo | | | 7.665% $3515/mo | | | floating LIBOR+2.25% | | | | |

FROM FIG. 16A

| | | | | | |
|---|---|---|---|---|---|
| 0.51% $2546 | 1.96% $9815 | 2.18% $10905 | 48 | 6.000% $2998/mo | 7.680% $3320/mo → 1627  floating LIBOR+2.25% |
| 0.54% $2690 | 2.41% $12042 | 2.88% $13380 | 60 | 6.000% $2998/mo | 7.690% $3523/mo  floating LIBOR+2.25% |
| 0.57% $2834 | 2.85% $14244 | 3.17% $15826 | 72 | 6.000% $2998/mo | 7.700% $3327/mo  1626  floating LIBOR+2.25% |
| 0.60% $2978 | 3.28% $16420 | 3.65% $18245 | 84 | 6.000% $2998/mo  1621 | 7.710% $3530/mo  floating LIBOR+2.25% |

* Payments are estimated and do not include taxes, insurance, and other fees. Your actual payment may be higher. Rate can be adjusted and an equivalent termination fee will apply.

Remember: If the customer takes the deal, he/she must pay the LOCKED rate even if future rates decline below the locked rate!
Reset Form for new calculation
Recalculate with preferred lock-in rate (monthly payment $) of [use forward swap rate ▼] [Submit Query]
                                                                    1620

| use forward swap rate |
|---|
| 6.000% ($2998) |
| 6.125% ($3035) |
| 6.250% ($3073) |
| 6.375% ($3111) |
| 6.500% ($3149) |
| 6.625% ($3188) |
| 6.750% ($3227) |
| 6.875% ($3265) |
| 7.000% ($3304) |
| 7.125% ($3344) |

FIG. 16B

CHARM Rate Agreements

| | Firm | Flex | Cap |
|---|---|---|---|
| In Brief | Locks in a secondary fixed rate protection period | An option to enter into a firm rate agreement later | Floating rate with your choice of cap. Rates may float below the cap, but are capped above. |
| Non-refundable Up-front fee | Low | Moderate | Premium |
| YMF Yield Maintenance Fee upon refinance | (Lock Rate - Unknown Future Market-Based Rate) x Remainder of Lock Period | None before decision deadline. Converts to firm ymf formula if protection activated. | None! |
| Best for: | locking in a rate now without paying extra for a wait-and-see approach | protecting customers desiring a wait and see approach towards future rates | those desiring no-compromise protection from rising rates. A premium product at a premium price. |
| Downside if rates fall: | Can not be economically cancelled. Customer still locked in if rates fall. Refinancing involves YMF. | A decision must be made on the activation deadline: convert to a firm lock or cancel. Easy for big rate moves but tricky if rates are flat. | None! Customer benefits from reduced rates. |
| Bottom line: | Low cost lock-in | Good protection with limited downside. | Premium protection in up and down markets |

FROM FIG. 17A

Select options for quote and comparison of all CHARM types.

Loan Amount: $500000
Home Value: $75000 — 1710
715 — Fully Amortizing Schedule: 30-years
720 — Loan Start Rate: 40-years
725 — Start-rate amortization: 30-years
730 — First Rate Reset Date: 20-years / 15-years / ng from today
735 — Loan Reset Rate: LIBOR + 2.250%  This rate is unprotected.
740 — LIBOR Index: 6-month LIBOR ** 12-month LIBOR and 1-year LIBOR are equivalent terms.
745 — Loan Reset Amortization (unprotected): fully-amortizing
750 — Preferred CHARM rate: use forward swap rates
755 — CHARM amortization: fully-amortizing
Roll fees into loan: ☐
Display LTV when rolling in fees: ☐
Submit for rates: Submit Query

FIG. 17B

CHARM Rate Agreements

| | Firm | Flex | Cap |
|---|---|---|---|
| In Brief | Locks in a secondary fixed rate protection period | An option to enter into a firm rate agreement later | Floating rate with your choice of cap. Rates may float below the cap, but are capped above. |
| Non-refundable Up-front fee: | Low | Moderate | Premium |
| YMF Yield Maintenance Fee upon refinance | (Lock Rate - Unknown Future Market-Based Rate) x Remainder of Lock Period | None before decision deadline. Converts to firm ymf formula if protection activated. | None! |
| Best for: | locking in a rate now without paying extra for a wait-and-see approach | protecting customers desiring a wait and see approach towards future rates | those desiring no-compromise protection from rising rates. A premium product at a premium price. |
| Downside if rates fall: | Can not be economically cancelled. Customer still locked in if rates fall. Refinancing invokes YMF. | A decision must be made on the activation deadline: convert to a firm lock or cancel. Easy for big rate moves but tricky if rates are flat. | None! Customer benefits from reduced rates. |
| Bottom line: | Low cost lock-in | Good protection with limited downside. | Premium protection in up and down markets |

FROM FIG. 18A

Select options for quote and comparison of all CHARM types.

Loan Amount: $500000
Home Value: $750000
Fully Amortizing Schedule: 30-years ▷
Loan Start Rate: 6.000% ▷
Start-rate amortization: 6.000% ◁ ing ▷
First Rate Reset Date: 6.125% from today
Loan Reset Rate: 6.250% ▷
 6.375% 250%** ▷  * This rate is unprotected.
 6.500%
LIBOR Index: 6.625% BOR ▷  ** 12-month LIBOR and 1-year LIBOR are equivalent terms.
Loan Reset Amortization (unprotected): 6.750% ing ▷
Preferred CHARM rate: 7.000% swap rates ▷
 7.125%
CHARM amortization: 7.250% ing ▷

Roll fees into loan: ☐
Display LTV when rolling in fees: ☐

Submit for rates   [Submit Query]

FIG. 18B

| CHARM Rate Agreements | | | |
|---|---|---|---|
| | Firm | Flex | Cap |
| In Brief | Locks in a secondary fixed rate protection period | An option to enter into a firm rate agreement later | Floating rate with your choice of cap. Rates may float below the cap, but are capped above. |
| Non-refundable Up-front fee | Low | Moderate | Premium |
| YMF Yield Maintenance Fee upon refinance | (Lock Rate - Unknown Future Market-Based Rate) x Remainder of Lock Period | None before decision deadline. Converts to firm ymf formula if protection activated. | None! |
| Best for: | locking in a rate now without paying extra for a wait-and-see approach | protecting customers desiring a wait and see approach towards future rates | those desiring no-compromise protection from rising rates. A premium product at a premium price. |
| Downside if rates fall: | Can not be economically cancelled. Customer still locked in if rates fall. Refinancing invokes YMF. | A decision must be made on the activation deadline: convert to a firm lock or cancel. Easy for big rate moves but tricky if rates are flat. | None! Customer benefits from reduced rates. |
| Bottom line: | Low cost lock-in | Good protection with limited downside. | Premium protection in up and down markets |

FROM FIG. 19A

Select options for quote and comparison of all CHARM types.

Loan Amount: $ [500000]
Home Value: $ [750000]
Fully Amortizing Schedule: [30-years ▷]
Loan Start Rate: [6.000% ▷]
Start-rate amortization: [fully-amortizing ▷]
  fully-amortizing
  interest only
First Rate Reset Date: [today ▷]
Loan Reset Rate: [LIBOR + 2.250%** ▷]
LIBOR Index: [6-month LIBOR ▷]
Loan Reset Amortization (unprotected): [fully-amortizing ▷]
Preferred CHARM rate: [use forward swap rates ▷]
CHARM amortization: [fully-amortizing ▷]
Roll fees into loan: ☐
Display LTV when rolling in fees: ☐
Submit for rates [Submit Query]

** This rate is unprotected.
** 12-month LIBOR and 1-year LIBOR are equivalent terms.

FIG. 19B

CHARM Rate Agreements

| | Firm | Flex | Cap |
|---|---|---|---|
| In Brief | Locks in a secondary fixed rate protection period | An option to enter into a firm rate agreement later | Floating rate with your choice of cap. Rates may float below the cap, but are capped above. |
| Non-refundable Up-front fee | Low | Moderate | Premium |
| YMF Yield Maintenance Fee upon refinance | (Lock Rate - Unknown Future Market-Based Rate) x Remainder of Lock Period | None before decision deadline. Converts to firm ymf formula if protection activated. | None! |
| Best for: | locking in a rate now without paying extra for a wait-and-see approach | protecting customers desiring a wait and see approach towards future rates | those desiring no-compromise protection from rising rates. A premium product at a premium price. |
| Downside if rates fall: | Can not be economically cancelled. Customer still locked in if rates fall. Refinancing invokes YMF. | A decision must be made on the activation deadline: convert to a firm lock or cancel. Easy for big rate moves but tricky if rates are flat. | None! Customer benefits from reduced rates. |
| Bottom line: | Low cost lock-in | Good protection with limited downside. | Premium protection in up and down markets |

FROM FIG. 20A

Select options for quote and comparison of all CHARM types.

Loan Amount: $ [500000]

Home Value: $ [750000]

Fully Amortizing Schedule: [30-years ▷]

Loan Start Rate: [6.000%] ▷

Start-rate amortization: [fully-amortizing ▷]

First Rate Reset Date: [3 Years ▷] from today

Loan Reset Rate: [1 Years / 2 Years / 050%++ ▷] ++ This rate is unprotected.

LIBOR Index: [3 Years / BOR ▷] ++ 12-month LIBOR and 1-year LIBOR are equivalent terms.

Loan Reset Amortization (unprotected): [4 Years / 5 Years / ing ▷]

Preferred CHARM rate: [6 Years / 7 Years / swap rates ▷]

CHARM amortization: [fully-amortizing ▷]

Roll fees into loan: ☐

Display LTV when rolling in fees: ☐

Submit for rates [Submit Query]

FIG. 20B

CHARM Rate Agreements

| | Firm | Flex | Cap |
|---|---|---|---|
| In Brief | Locks in a secondary fixed rate protection period | An option to enter into a firm rate agreement later | Floating rate with your choice of cap. Rates may float below the cap, but are capped above. |
| Non-refundable Up-front fee | Low | Moderate | Premium |
| YMF Yield Maintenance Fee upon refinance | (Lock Rate - Unknown Future Market-Based Rate) x Remainder of Lock Period | None before decision deadline. Converts to firm ymf formula if protection activated. | None! |
| Best for: | locking in a rate now without paying extra for a wait-and-see approach | protecting customers desiring a wait and see approach towards future rates | those desiring no-compromise protection from rising rates. A premium product at a premium price. |
| Downside if rates fall: | Can not be economically cancelled. Customer still locked in if rates fall. Refinancing invokes YMF. | A decision must be made on the activation deadline: convert to a firm lock or cancel. Easy for big rate moves but tricky if rates are flat. | None! Customer benefits from reduced rates. |
| Bottom line: | Low cost lock-in | Good protection with limited downside. | Premium protection in up and down markets |

FROM FIG. 21A

Select options for quote and comparison of all CHARM types.

Loan Amount: $500000
Home Value: $750000
Fully Amortizing Schedule: 30-years
Loan Start Rate: 6.000%
Start-rate amortization: fully-amortizing
First Rate Reset Date: 3 Years from today
Loan Reset Rate: LIBOR + 2.250%**
LIBOR Index: LIBOR + 2.250%**
LIBOR + 2.500%**
Loan Reset Amortization (unprotected): LIBOR + 2.750%**
LIBOR + 3.000%**
Preferred CHARM rate: LIBOR + 3.250%**
LIBOR + 3.500%**
CHARM amortization: LIBOR + 3.750%**
LIBOR + 4.000%**
Roll fees into loan: LIBOR + 4.250%**
LIBOR + 4.500%**
Display LTV when rolling in fees: LIBOR + 4.750%**
Submit for rates

** This rate is unprotected.
‡‡ 12-month LIBOR and 1-year LIBOR are equivalent terms.

FIG. 21B

CHARM Rate Agreements

| | Firm | Flex | Cap |
|---|---|---|---|
| In Brief | Locks in a secondary fixed rate protection period | An option to enter into a firm rate agreement later | Floating rate with your choice of cap. Rates may float below the cap, but are capped above. |
| Non-refundable Up-front fee | Low | Moderate | Premium |
| YMF Yield Maintenance Fee upon refinance | (Lock Rate - Unknown Future Market-Based Rate) x Remainder of Lock Period | None before decision deadline. Converts to firm ymf formula if protection activated. | None! |
| Best for: | locking in a rate now without paying extra for a wait-and-see approach | protecting customers desiring a wait and see approach towards future rates | those desiring no-compromise protection from rising rates. A premium product at a premium price. |
| Downside if rates fall: | Can not be economically cancelled. Customer still locked in if rates fall. Refinancing invokes YMF. | A decision must be made on the activation deadline: convert to a firm lock or cancel. Easy for big rate moves but tricky if rates are flat. | None! Customer benefits from reduced rates. |
| Bottom line: | Low cost lock-in | Good protection with limited downside. | Premium protection in up and down markets |

FROM FIG. 22A

Select options for quote and comparison of all CHARM types.

- Loan Amount: $ [500000]
- Home Value: $ [750000]
- Fully Amortizing Schedule: [30-years ▷]
- Loan Start Rate: [6.000% ▷]
- Start-rate amortization: [fully-amortizing ▷]
- First Rate Reset Date: [3 Years ▷] from today
- Loan Reset Rate: [LIBOR + 2.250% ▷]    This rate is unprotected.
- LIBOR Index: [6-month LIBOR ▷]
- Loan Reset Amortization (unprotected): [3-month LIBOR ▷]
- Preferred CHARM rate: [6-month LIBOR ▷]   ‡‡ 12-month LIBOR and 1-year LIBOR are equivalent terms.
  [12-month LIBOR ‡‡ ▷]
- CHARM amortization: [fully-amortizing ▷]
- Roll fees into loan: ☐
- Display LTV when rolling in fees: ☐

[Submit for rates]   [Submit Query]

FIG. 22B

CHARM Rate Agreements

| | Firm | Flex | Cap |
|---|---|---|---|
| In Brief | Locks in a secondary fixed rate protection period | An option to enter into a firm rate agreement later | Floating rate with your choice of cap. Rates may float below the cap, but are capped above. |
| Non-refundable Up-front fee | Low | Moderate | Premium |
| YMF Yield Maintenance Fee upon refinance | (Lock Rate - Unknown Future Market-Based Rate) x Remainder of Lock Period | None before decision deadline. Converts to firm ymf formula if protection activated. | None! |
| Best for: | locking in a rate now without paying extra for a wait-and-see approach | protecting customers desiring a wait and see approach towards future rates | those desiring no-compromise protection from rising rates. A premium product at a premium price. |
| Downside if rates fall: | Can not be economically cancelled. Customer still locked in if rates fall. Refinancing invokes YMF. | A decision must be made on the activation deadline: convert to a firm lock or cancel. Easy for big rate moves but tricky if rates are flat. | None! Customer benefits from reduced rates. |
| Bottom line: | Low cost lock-in | Good protection with limited downside. | Premium protection in up and down markets |

Select options for quote and comparison of all CHARM types.

- Loan Amount: $500000
- Home Value: $750000
- Fully Amortizing Schedule: 30-years
- Loan Start Rate: 6.000%
- Start-rate amortization: fully-amortizing
- First Rate Reset Date: 3 Years from today
- Loan Reset Rate: LIBOR + 2.250%** †† This rate is unprotected.
- LIBOR Index: 6-month LIBOR ** 12-month LIBOR and 1-year LIBOR are equivalent terms.
- Loan Reset Amortization (unprotected): fully-amortizing
- Preferred CHARM rate: fully-amortizing / interest-only 10 years
- CHARM amortization: fully-amortizing
- Roll fees into loan: ☐
- Display LTV when rolling in fees: ☐
- Submit for rates: [Submit Query]

FROM FIG. 23A

FIG. 23B

CHARM Rate Agreements

| | Firm | Flex | Cap |
|---|---|---|---|
| In Brief | Locks in a secondary fixed rate protection period | An option to enter into a firm rate agreement later | Floating rate with your choice of cap. Rates may float below the cap, but are capped above. |
| Non-refundable Up-front fee | Low | Moderate | Premium |
| YMF Yield Maintenance Fee upon refinance | (Lock Rate - Unknown Future Market-Based Rate) x Remainder of Lock Period | None before decision deadline. Converts to firm ymf formula if protection activated. | None! |
| Best for: | locking in a rate now without paying extra for a wait-and-see approach | protecting customers desiring a wait and see approach towards future rates | those desiring no-compromise protection from rising rates. A premium product at a premium price. |
| Downside if rates fall: | Can not be economically cancelled. Customer still locked in if rates fall. Refinancing invokes YMF. | A decision must be made on the activation deadline: convert to a firm lock or cancel. Easy for big rate moves but tricky if rates are flat. | None! Customer benefits from reduced rates. |
| Bottom line: | Low cost lock-in | Good protection with limited downside. | Premium protection in up and down markets |

Select options for quote and comparison of all CHARM types.

Loan Amount: $500000
Home Value: $750000
Fully Amortizing Schedule: 30-years ▷
Loan Start Rate: 6.000% ▷
Start-rate amortization: fully-amortizing ▷
First Rate Reset Date: 3 Years ▷ from today
Loan Reset Rate: LIBOR + 2.250%** ▷
LIBOR Index: 6-month LIBOR ▷
Loan Reset Amortization (unprotected): fully-amortizing ▷
Preferred CHARM rate: use forward swap rates ▷
CHARM amortization: use forward swap rates ◁
Roll fees into loan: 6.000%
6.125%
Display LTV when rolling in fees: 6.250%
6.375%
6.500%
6.625%
Submit for rates 6.750%
6.875%
7.000%
7.125% ▷

** This rate is unprotected.
** 12-month LIBOR and 1-year LIBOR are equivalent terms.

FROM FIG. 24A

FIG. 24B

CHARM Rate Agreements

| | Firm | Flex | Cap |
|---|---|---|---|
| In Brief | Locks in a secondary fixed rate protection period | An option to enter into a firm rate agreement later | Floating rate with your choice of cap. Rates may float below the cap, but are capped above. |
| Non-refundable Up-front fee | Low | Moderate | Premium |
| YMF Yield Maintenance Fee upon refinance | (Lock Rate - Unknown Future Market-Based Rate) x Remainder of Lock Period | None before decision deadline. Converts to firm ymf formula if protection activated. | None! |
| Best for: | locking in a rate now without paying extra for a wait-and-see approach | protecting customers desiring a wait and see approach towards future rates | those desiring no-compromise protection from rising rates. A premium product at a premium price. |
| Downside if rates fall: | Can not be economically cancelled. Customer still locked in if rates fall. Refinancing invokes YMF. | A decision must be made on the activation deadline: convert to a firm lock or cancel. Easy for big rate moves but tricky if rates are flat. | None! Customer benefits from reduced rates. |
| Bottom line: | Low cost lock-in | Good protection with limited downside. | Premium protection in up and down markets |

FROM FIG. 25A

Select options for quote and comparison of all CHARM types.

Loan Amount: $500000
Home Value: $750000
Fully Amortizing Schedule: 30-years ▷
Loan Start Rate: 6.000% ▷
Start-rate amortization: fully-amortizing ▷
First Rate Reset Date: 3 Years ▷ from today
Loan Reset Rate: LIBOR + 2.250% ▷   \ This rate is unprotected.
LIBOR Index: 6-month LIBOR ▷   \** 12-month LIBOR and 1-year LIBOR are equivalent terms.
Loan Reset Amortization (unprotected): fully-amortizing ▷
Preferred CHARM rate: use forward swap rates ▷
CHARM amortization: fully-amortizing ▷
  fully-amortizing
  interest-only
Roll fees into loan:
Display LTV when rolling in fees:

Submit for rates  [Submit Query]

FIG. 25B

CHARM Rate Agreements

Rate Results for March 23

Rates based on entered data:

- Lock-In Protection Start Date: 37 months from today
- Loan Amount: $500000
- Home Value: $750000
- Loan Reset Rate: 6mo-LIBOR + 2.25% original loan
- Fully amortizing schedule: 30-years
- Start rate amortization: fully-amortizing
- Protected Amortization: fully-amortizing
- Loan Balance on Reset Date: $480420

| Up-front CHARM fee | | | Lock Duration (months) | Initial Rate Period | | | Revised Loan Rate Schedule for Period Shown | | | | | | | | |
|---|---|---|---|---|---|---|---|---|---|---|---|---|---|---|---|
| | | | | | | | | | Purchased CHARM Period (Green) / Floating Rate Period (Red) | | | | | | |
| Firm Rate | Flex Rate | Cap Rate | | Month 1-12 | Month 13-24 | Month 25-36 | Month 37-48 | Month 49-60 | Month 61-72 | Month 73-84 | Month 85-96 | Month 97-108 | Month 109-120 | Month 121-132 |
| 0.39% $1969 | 0.62% $3089 | 0.69% $3432 | 12 | 6.000% $2998/mo | 6.000% $2998/mo | 6.000% $2998/mo | 7.640% $3507/mo | floating LIBOR+2.25% | | | | | | |
| 0.42% $2113 | 1.06% $5310 | 1.18% $5500 | 24 | 6.000% $2998/mo | 6.000% $2998/mo | 6.000% $2998/mo | 7.650% $3511/mo | 7.650% $3511/mo | floating LIBOR+2.25% | | | | | |
| 0.47% $2330 | 1.52% $7583 | 1.69% $8426 | 36 | 6.000% $2998/mo | 6.000% $2998/mo | 6.000% $2998/mo | 7.665% $3515/mo | 7.665% $3515/mo | 7.665% $3515/mo | | floating LIBOR+2.25% | | | |

CHARM Rate Agreements

Rate Results for March 23

Rates based on entered data:
- Lock-In Protection Start Date: 37 months from today
- Loan Amount: $500000
- Home Value: $750000
- Loan Reset Rate: 6mo-LIBOR + 2.25% original loan
- Fully amortizing schedule: 30-years
- Start rate amortization: fully-amortizing
- Protected Amortization: fully-amortizing
- Loan Balance on Reset Date: $480420

| Up-front CHARM fee | | | Lock Duration (months) | Initial Rate Period | | | Revised Loan Rate Schedule for Period Shown | | | | | | | |
|---|---|---|---|---|---|---|---|---|---|---|---|---|---|---|
| Firm Rate | Flex Rate | Cap Rate | | Month 1-12 | Month 13-24 | Month 25-36 | Purchased CHARM Period (Green) / Floating Rate Period (Red) | | | | | | | |
| | | | | | | | Month 37-48 | Month 49-60 | Month 61-72 | Month 73-84 | Month 85-96 | Month 97-108 | Month 109-120 | Month 121-132 |
| 0.39% $1969 | 0.62% $3089 | 0.69% $3432 | 12 | 6.000% $2998/mo | 6.000% $2998/mo | 6.000% $2998/mo | 7.640% $3507/mo | floating LIBOR+2.25% | | | | | | |
| 0.42% $2113 | 1.06% $5310 | 1.18% $5900 | 24 | | | | 7.650% $3511/mo | | floating LIBOR+2.25% | | | | | |
| 0.47% $2330 | 1.52% $7563 | 1.69% $8426 | 36 | | | | 7.665% $3515/mo | | | floating LIBOR+2.25% | | | | |

CHARM Rate Agreements

| | Firm | Flex | Cap |
|---|---|---|---|
| In Brief | Locks in a secondary fixed rate protection period | An option to enter into a firm rate agreement later | Floating rate with your choice of cap. Rates may float below the cap, but are capped above. |
| Non-refundable Up-front fee | Low | Moderate | Premium |
| YMF Yield Maintenance Fee upon refinance | (Lock Rate - Unknown Future Market-Based Rate) x Remainder of Lock Period | None before decision deadline. Converts to firm ymf formula if protection activated. | None! |
| Best for: | locking in a rate now without paying extra for a wait-and-see approach | protecting customers desiring a wait and see approach towards future rates | those desiring no-compromise protection from rising rates. A premium product at a premium price. |
| Downside if rates fall: | Can not be economically cancelled. Customer still locked in if rates fall. Refinancing involves YMF. | A decision must be made on the activation deadline: convert to a firm lock or cancel. Easy for big rate moves but tricky if rates are flat. | None! Customer benefits from reduced rates. |
| Bottom line: | Low cost lock-in | Good protection with limited downside. | Premium protection in up and down markets |

FROM FIG. 28A

Select options for quote and comparison of all CHARM types.

Loan Amount: $500000
Home Value: $750000
Fully Amortizing Schedule: 30-years
Loan Start Rate: 6.000%
Start-rate amortization: fully-amortizing
First Rate Reset Date: 3 Years from today
Loan Reset Rate: LIBOR + 2.250%  This rate is unprotected.
LIBOR Index: 6-month LIBOR ** 12-month LIBOR and 1-year LIBOR are equivalent terms.
Loan Reset Amortization (unprotected): fully-amortizing
Preferred CHARM rate: use forward swap rates
CHARM amortization: fully-amortizing
2810 → Roll fees into loan: ☑
2820 → Display LTV when rolling in fees: ☐
Submit for rates  Submit Query

FIG. 28B

CHARM Rate Agreements

Rate Results for March 23

Rates based on entered data:
Lock-In Protection Start Date: 37 months from today
Loan Amount: $500000
Home Value: $750000
Loan Reset Rate: 6mo-LIBOR + 2.25% original loan
Fully amortizing schedule: 30-years
Start rate amortization: fully-amortizing
Protected Amortization: fully-amortizing
Loan Balance on Reset Date: $480420

2910

| Percent CHARM loan increase | | | Lock Duration (months) | Initial Rate Period | | | Revised Loan Rate Schedule for Period Shown | | | | | | |
|---|---|---|---|---|---|---|---|---|---|---|---|---|---|
| | | | | | | | 2920 | Purchased CHARM Period (Green) / Floating Rate Period (Red) | | | | | |
| Firm Rate | Flex Rate | Cap Rate | | Month 1-12 | Month 13-24 | Month 25-36 | Month 37-48 | Month 49-60 | Month 61-72 | Month 73-84 | Month 85-96 | Month 97-108 | Month 109-120 | Month 121-132 |
| 0.40% | 0.62% | 0.69% | 12 | 6.000% $3010/mo (firm) $3016/mo (flex) $3018/mo (cap) | | | 7.640%* $3521/mo (firm) $3529/mo (flex) $3532/mo (cap) | floating LIBOR+2.25% | | | | | |
| 0.42% | 1.07% | 1.19% | 24 | 6.000% $3010/mo (firm) $3030/mo (flex) $3034/mo (cap) | | | | 7.650%* $3525/mo (firm) $3548/mo (flex) $3553/mo (cap) | | | | floating LIBOR+2.25% | |

FROM FIG. 29A

| | | | | | |
|---|---|---|---|---|---|
| 0.47% | 1.54% | 1.71% | 36 | 6.000%<br>$3012/mo (firm)<br>$3044/mo (flex)<br>$3049/mo (cap) | 7.665%*<br>$3532/mo (firm)<br>$3570/mo (flex)<br>$3576/mo (cap) / floating LIBOR+2.25% |
| 0.51% | 2.00% | 2.23% | 48 | 6.000%<br>$3013/mo (firm)<br>$3058/mo (flex)<br>$3065/mo (cap) | 7.680%*<br>$3538/mo (firm)<br>$3591/mo (flex)<br>$3599/mo (cap) / floating LIBOR+2.25% |
| 0.54% | 2.47% | 2.75% | 60 | 6.000%<br>$3014/mo (firm)<br>$3072/mo (flex)<br>$3080/mo (cap) | 7.690%*<br>$3543/mo (firm)<br>$3610/mo (flex)<br>$3620/mo (cap) / floating LIBOR+2.25% |
| 0.57% | 2.93% | 3.27% | 72 | 6.000%<br>$3015/mo (firm)<br>$3086/mo (flex)<br>$3096/mo (cap) | 7.700%*<br>$3547/mo (firm)<br>$3630/mo (flex)<br>$3642/mo (cap) / floating LIBOR+2.25% |
| 0.60% | 3.40% | 3.79% | 84 | 6.000%<br>$3016/mo (firm)<br>$3100/mo (flex)<br>$3111/mo (cap) | 7.710%*<br>$3551/mo (firm)<br>$3650/mo (flex)<br>$3664/mo (cap) / floating LIBOR+2.25% |

* Payments are estimated and do not include taxes, insurance, and other fees. Your actual payment may be higher. Rate can be adjusted and the table recalculated using the button below

FIG. 29B

Savings Calculator - Step 1

The savings analysis requires some loan information and two interest rate scenarios. This information may have already been filled in if you are visiting via a link from another page. This page asks for the loan information and enough information to create the initial unprotected and protected interest rate scenarios. The next page will let you edit the two interest rate scenarios. You will be able to change the interest rates on a year to year basis and see how it affects the loan payments, total interest, and principal paid (or equity accumulated).

| Ref | Field | Value | Unit |
|---|---|---|---|
| 3005 | Loan Amount: | $ 500000 | |
| 3010 | Scenario #2 - Fees rolled in: | $ 2121 | |
| 3015 | Loan Start Date: | 6 | % |
| 3020 | Fixed Rate Period: | 36 | months |
| 3025 | Interest Only Period: | | months |
| 3030 | (+)Amortization Period: | 360 | months |
| 3035 | Todays LIBOR Index Rate: | 5.25 | % |
| 3040 | LIBOR Loan Margin: | 2.25 | % |
| 3045 | Scenario #1 - Unprotected Assume LIBOR rises: | 1 | %/year |
| 3050 | Scenario #1 - Unprotected Assume Floating maximum effective retail rate: | 12 | % |
| 3055 | Scenario #1 - Start Rate Interest Only Period: | 0 | months |
| 3060 | Scenario #1 - Additional Reset Rate Interest Only Period: | 0 | months |
| 3065 | Scenario #2 - Protected Purchased protection lock/cap rate: | 7.65 | % |
| 3070 | Scenario #2 - Start Rate Interest Only Period: | 0 | months |
| 3075 | Scenario #2 - Additional Reset Rate Interest Only Period: | 0 | months |
| 3080 | Analysis Period: | 60 | months |

[ Submit Query ]

FIG. 30

Savings Calculator - Step 2

Enter an interest rate forecast for an unprotected loan and also for a loan protected with the selected lock or cap product.

|  | Months 3110 | | | | |
|---|---|---|---|---|---|
|  | 1-12 | 13-24 | 23-36 | 37-48 | 49-60 |
| Scenario 1 | 6 | 6 | 6 | 10.5 | 11.5 |
| Scenario 2 | 6 | 6 | 6 | 7.65 | 7.65 |

3120

[Submit Query]

FIG. 31

SYSTEM AND METHOD FOR PROVIDING A CUSTOM HEDGED ADJUSTABLE RATE MORTGAGE

CROSS-REFERENCE TO RELATED APPLICATIONS

This application claims the benefit of U.S. Provisional Patent Application Nos. 60/718,930, filed on Sep. 20, 2005, 60/777,448, filed on Feb. 27, 2006, and 60/797,963, filed on May 5, 2006, each of which are hereby incorporated by reference herein in their entireties.

FIELD OF THE INVENTION

The present invention relates to lending products. More particularly, the invention relates to mortgage lending, custom hedging of an adjustable rate mortgage; residential interest rate cap mortgages, and custom hedged adjustable rate mortgages.

BACKGROUND OF THE INVENTION

A mortgage is a loan secured by the collateral of some specified real estate and is a contractual agreement between the lender and the borrower that pledges the property to a lender as security for the repayment of the loan through a series of payments. The mortgage also entitles the lender (the mortgagee) the right of foreclosure on the loan if the borrower (the mortgagor) fails to make the contracted payments.

Mortgages can be divided into categories on the basis of various attributes: whether the real estate is residential, like single family houses or multiple family condominiums, or commercial, like office buildings, shopping malls, hotels, warehouses, factories; whether the loan is "conventional" or "guaranteed"—that is guaranteed by a government agency as is the case with borrowers eligible for special loan programs established by the Federal Housing Administration (FHA), the Veteran's Administration (VA), or the Rural Development Administration (RDA); whether the rate of interest on the loan is fixed in advanced (fixed rate mortgage), adjusts (ARM or adjustable rate mortgage) with a market index such as a six-month index based on the London Interbank Offer Rate (LIBOR) or 1 year Constant Maturity Treasury Indexes (CMT), or is a hybrid that is fixed for a period of time such as 1, 3, 5, or 7 years and is then becomes adjustable; and how and when the amortization, or the payment of the principal of the loan, is to occur (for example, a loan may have a fixed amortization period such as 10, 20, 30, 40 years (or as is common in Asia, 100 years), may be an interest-only loan with the principal due at the end of the loan, or may be interest only for a period of years and then change to a 30 year amortization period).

The market where the funds are borrowed is called the mortgage market. Typically, in this market there is a primary market consisting of individual borrowers, original lenders (who are typically banks or other financial institutions), and brokers. There is also a secondary market in which original lenders sell packages of loans to investors. These investors can be other banks, corporations, wealthy individuals, and the three Government Sponsored Enterprises (GSEs) (i.e., the Federal Home Loan Mortgage Corporation (Freddie Mac), the Government National Mortgage Association (Ginnie Mae), and the Federal National Mortgage Association (Fannie Mae)).

The simplest such packaging in the secondary market is a Mortgage Backed Security (MBS) that allocates payments of principal and interest from a pool of mortgages to an investor. As the package is a tradable security, the investor can decide at any time to sell the MBS to another investor on an actively traded market for such purposes. More advanced packaging can take various forms and structures such as Collateralized Mortgage Obligations (CMOs) that can separate out the principal and interest payments and also be used to manage risk by meeting specific maturity and volatility requirements of investors.

The primary risks that are being managed by investors in mortgage pools are the risks of default and prepayment. Default occurs when the borrower is unable or refuses to pay the loan. Many borrowers will default because of financial problems leading to bankruptcy. Another source of default is related to legal issues and explains default by some high-net-worth borrowers who are not in danger of bankruptcy. For example, because some states, such as California, limit a lender's security on an original (or "purchase money") mortgage to the real estate, some borrowers will default when real estate prices have fallen below the original purchase price. In the short run, it can be financially more advantageous to default than to pay the loan on a home with negative equity. Default risk is typically managed at the individual mortgage level through private mortgage insurance and, in some cases, pool-level guarantees of the three GSEs or by Government Agencies such as the Veteran's Administration. Prepayment is the opposite risk—the risk of a loan being paid-up ahead of schedule. Prepayment of existing loans typically occurs for two primary reasons: the turnover of the real estate to a new owner, and refinancing activity. Refinancing can be advantageous for borrowers when there is a reduction in available market interest rates not reflected in the borrower's existing loan or during the introduction of market innovations such as interest-only loans that can reduce the monthly payment of the borrower. The risks of prepayment subtract value from MBSs.

The borrower's abilities to default or prepay can be seen as two risk-management tools for the borrower. However, both default and prepayment are costly to lenders and investors and, with default, also to the borrower in terms of bad credit history. Innovations have stepped in to provide alternatives with benefits to both parties.

Currently, adjustable rate mortgages offer the borrower a lower rate now than fixed rate mortgages and exposure to the possibility of lower rates in the future (reducing prepayment risk to the lender/investor) in exchange for the borrower accepting the risk of higher rates in the future.

Some interest-only and teaser-rate loans offer a borrower an initial escape from high payments, but are often structured with a very low—below market—initial rate (e.g., 1%, 3%, etc.) and then a higher adjustable rate later on (e.g., 6 mo LIBOR+4%). For example, recently the 6 month LIBOR index rate was about 4.75% so that a LIBOR+4% loan would have an interest rate of about 8.75%. Borrowers who have agreed to these terms can expect their payments to multiply by a factor of 300% to 800% when the loan switches from the 1-3% fixed rate to the ~8.75% variable rate even if future rates do not increase further. If future rates rise, the effect will be even more profound.

By lowering interest rates and/or payments, these loans have enabled borrowers to make a $1 trillion bet on low future interest rates, rising future real estate prices, and rising future incomes. These bets come due when hybrid fixed/adjustable loans switch from the initial fixed-rate (which may be below market) to a market based adjustable rate. In 2005, an estimated $80 billion of mortgage debt was set to switch to an adjustable rate. The estimates for 2006 and 2007 are $300 billion, and $1 trillion, respectively. It seems likely that these bets may need to be hedged, both by the borrowers and by the lenders. This will most likely occur through refinancing to new products that are better able to account for and explain these risks.

The teaser-rate loans are an example of a market response to the borrower's need for low payments to qualify on a loan and lender's desire for high yields in selling the loans to investors. The market is very payment and interest rate sensitive. Initial buyers want to either minimize their payments or maximize their house purchasing power, while borrowers going through refinancing may be carefully rate shopping for their best subjective combination of fixed and adjustable rates.

Opportunities for a suite of new financial products in the primary and secondary lending markets exist for presenting new rates and risk profiles to the borrower and for greater transparency in how interest rate risk is to be shared between lenders and borrowers. Some of these opportunities can include third parties such as investors, insurers, or securities market participants. Many of these opportunities involve chopping-up well known financial derivatives products, such as swaps or options on $100 million of financing, into pieces suitable for residential borrowers. Other opportunities exist from enabling residential borrowers to hedge as only rich corporations and financial experts are able to do today.

SUMMARY OF THE INVENTION

In accordance with the present invention, methods, media, and systems for providing a custom hedged adjustable rate mortgage are provided. These methods, media, and systems provide hedges and mortgages that may be used in conjunction with the retail mortgage sector. To facilitate these hedges and mortgages, computer systems are provided that allow a user to calculate fees, interest rates, and payments for these products based upon various factors selected by a user. The methods, media, and systems also provide a savings calculator that enables a user to determine what savings will be made be purchasing a hedge and/or mortgage in accordance with the invention under one or more scenarios.

More particularly, in accordance with some embodiments of the invention, methods for determining costs associated with a residential mortgage including a hedge are provided, the methods comprising: receiving from a user variables defining the residential mortgage and the hedge to be applied to the residential mortgage; calculating an initial rate period rate that is associated with the residential mortgage; displaying to the user the initial rate period rate; and, for each of a plurality of durations during which the hedge may be applied to the mortgage: calculating a hedge period rate that applies for the duration during which the hedge may be applied to the mortgage; and displaying the hedge period rate.

In accordance with some embodiments of the invention, computer-readable media containing computer-executable instructions that, when executed by a processor, cause the processor to perform a method for determining costs associated with a residential mortgage including a hedge, are provided, the instructions comprising: receiving from a user variables defining the residential mortgage and the hedge to be applied to the residential mortgage; calculating an initial rate period rate that is associated with the residential mortgage; displaying to the user the initial rate period rate; and for each of a plurality of durations during which the hedge may be applied to the mortgage: calculating a hedge period rate that applies for the duration during which the hedge may be applied to the mortgage; and displaying the hedge period rate.

In accordance with some embodiments of the invention, systems for determining costs associated with a residential mortgage including a hedge are provided, the systems comprising: a processor that: receives from a user variables defining the residential mortgage and the hedge to be applied to the residential mortgage; calculates an initial rate period rate that is associated with the residential mortgage; and for each of a plurality of durations during which the hedge may be applied to the mortgage, calculates a hedge period rate that applies for the duration during which the hedge may be applied to the mortgage; and a display that: displays to the user the initial rate period rate; and for each of a plurality of durations during which the hedge may be applied to the mortgage, displays the hedge period rate.

BRIEF DESCRIPTION OF THE DRAWINGS

Various objects, features, and advantages of the present invention can be more fully appreciated with reference to the following detailed description of the invention when considered in connection with the following drawings, in which like reference numerals identify like elements.

FIG. 1 is a table showing examples of some of the types of financial hedges that a borrower may utilize in accordance with some embodiments of the present invention.

FIGS. 7A-15B (FIGS. 7A and 7B hereinafter "FIG. 7"; FIGS. 8A and 8B hereinafter "FIG. 8"; FIGS. 9A and 9B hereinafter "FIG. 9"; FIGS. 10A and 10B hereinafter "FIG. 10"; FIGS. 11A and 11B hereinafter "FIG. 11"; FIGS. 12A and 12B hereinafter "FIG. 12"; FIGS. 13A and 13B hereinafter "FIG. 13"; FIGS. 14A and 14B hereinafter "FIG. 14"; and FIGS. 15A and 15B hereinafter "FIG. 15") illustrate user interfaces of a system that allow a user to compare and select a desired mortgage that may be provided in accordance with some embodiments of the present invention.

FIGS. 16A and 16B (hereinafter "FIG. 16") illustrate a user interface of a graphical representation of various rates and products that may be produced based on input variations/ alternatives that may be provided in a system in accordance with some embodiments of the present invention.

FIGS. 17A-25B (FIGS. 17A and 17B hereinafter "FIG. 17"; FIGS. 15A and 18B hereinafter "FIG. 18"; FIGS. 19A and 19B hereinafter "FIG. 19"; FIGS. 20A and 20B hereinafter "FIG. 20": FIGS. 21A and 21B hereinafter "FIG. 21"; FIGS. 22A and 22B hereinafter "FIG. 22"; FIGS. 23A and 23B hereinafter "FIG. 23"; FIGS. 24A and 24B hereinafter "FIG. 24"; and FIGS. 25A and 25B hereinafter "FIG. 25") illustrate user interfaces of a system that allow a user to input additional variations for comparing and selecting a desired mortgage that may be provided in accordance with some embodiments of the present invention.

Figure 26B:
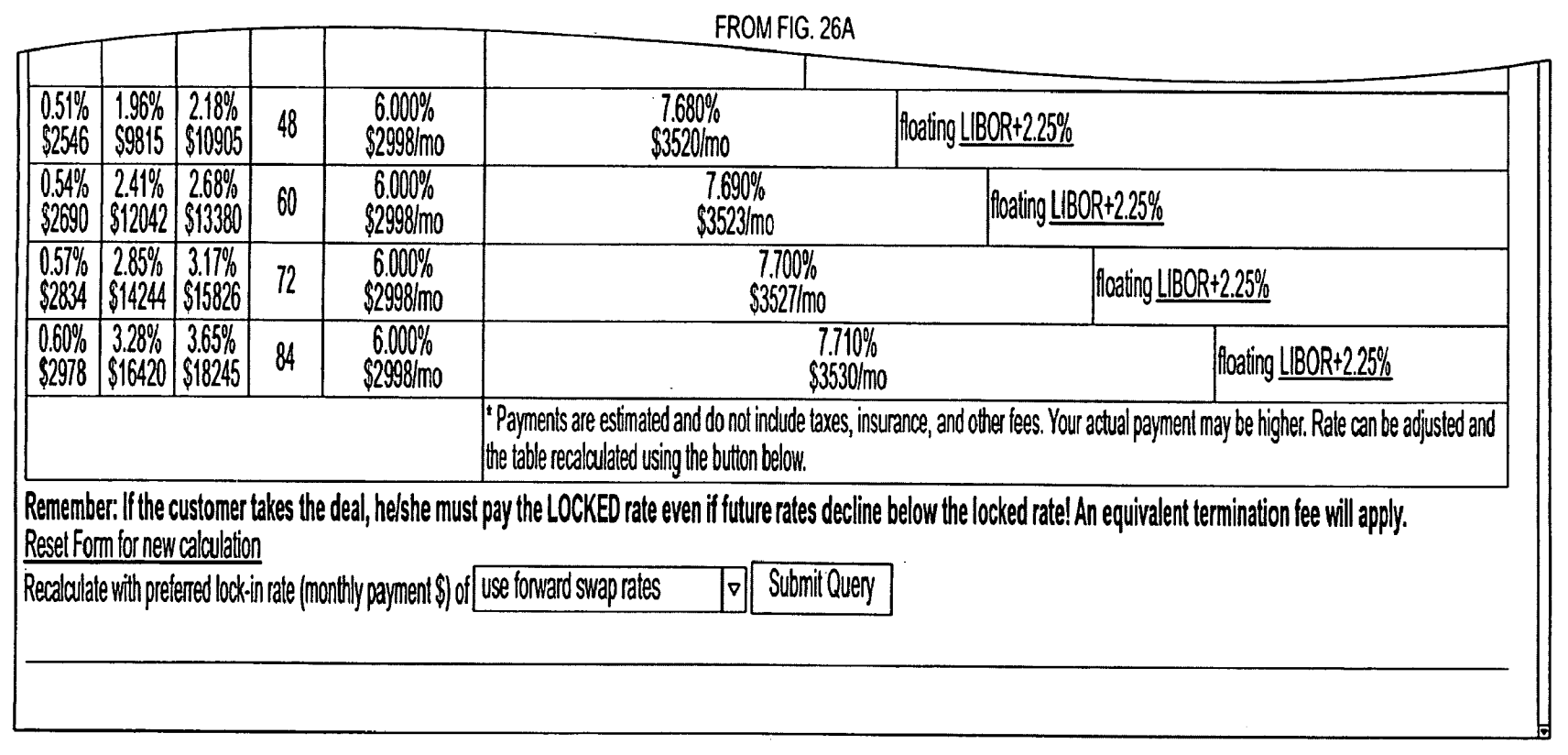
Figure 27B:
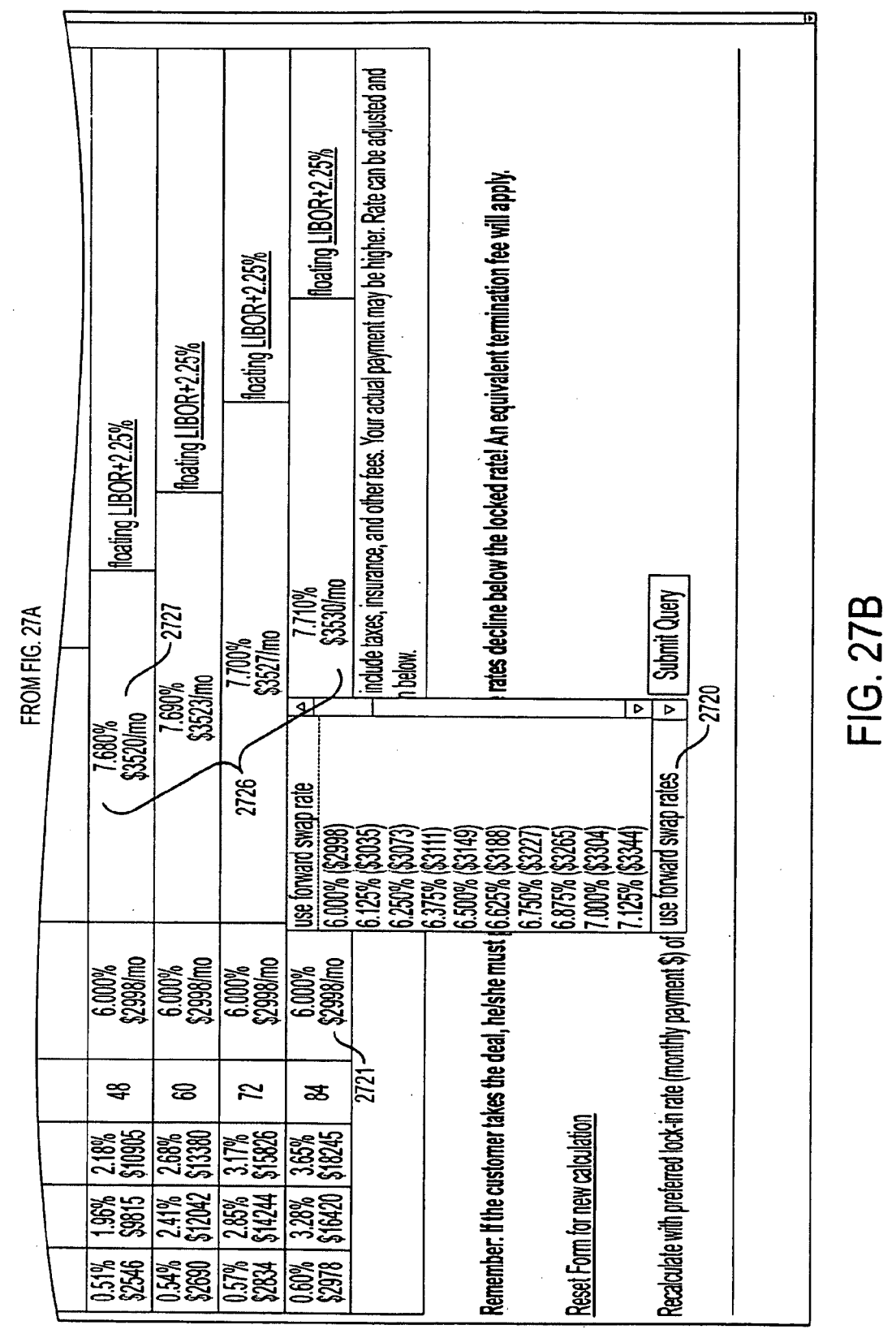

FIG. 26A-27B (FIGS. 26A and 26B hereinafter "FIG. 26"; and FIGS. 27A and 27B hereinafter "FIG. 27") illustrate user interfaces of a graphical representation of various rates and products that may be produced based on input variations/alternatives including additional variations, such as home value that may be provided in a system in accordance with some embodiments of the present invention.

FIG. 28 illustrates FIGS. 28A and 28B (hereinafter "FIG. 28") illustrate a user interface of a system that allows a user to select fees rolled into a loan that may be provided in accordance with some embodiments of the present invention.

FIGS. 29A and 29B (hereinafter "FIG. 29") illustrate a user interface of a graphical representation of various rates, products, and fees rolled into a loan produced based on input variations/alternatives that may be provided in a system in accordance with some embodiments of the present invention.

Figure 32:
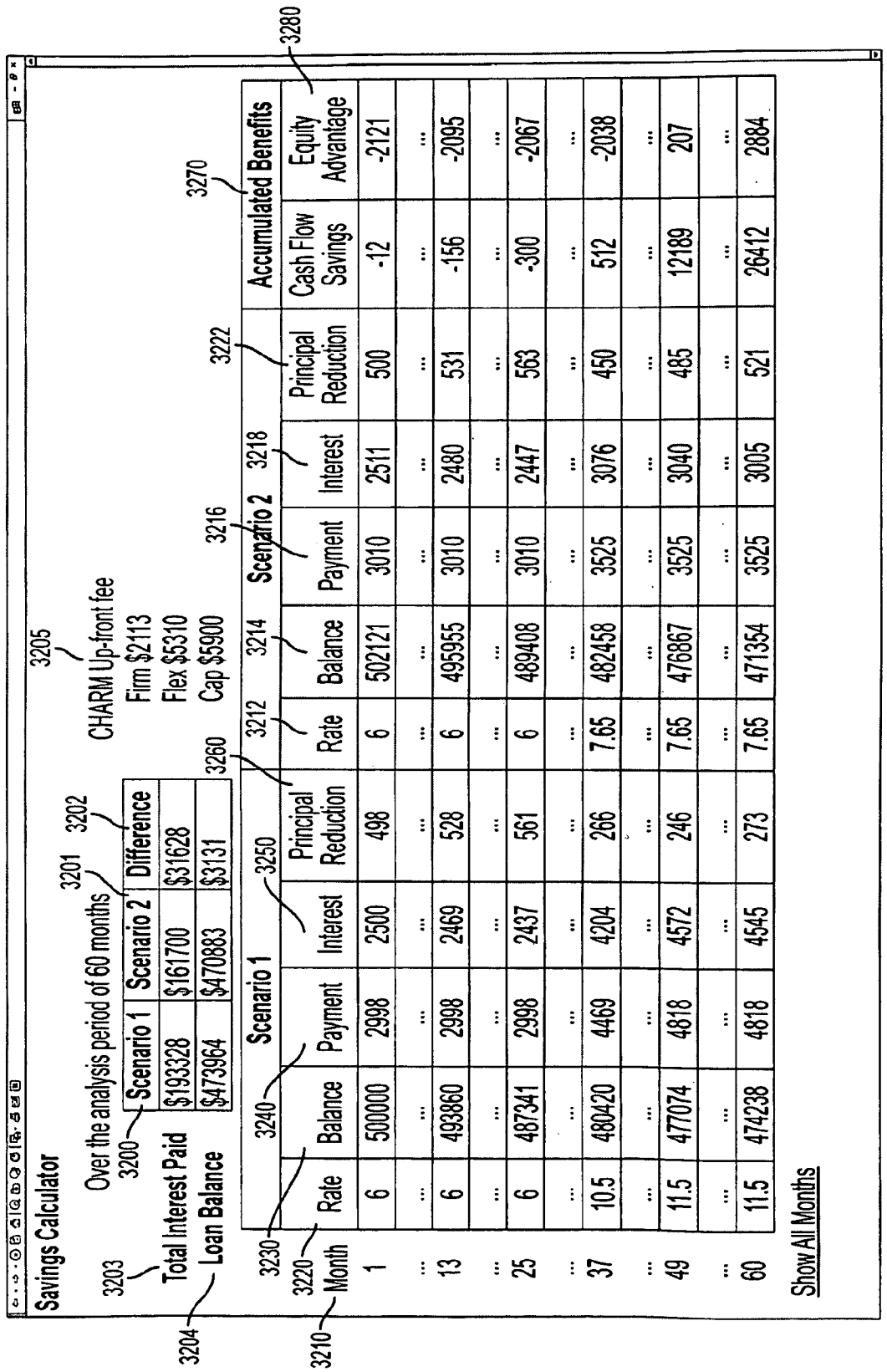

FIGS. 30-32 illustrate user interfaces of a savings calculator that may be provided in a system in accordance with some embodiments of the present invention.

Figure 33:
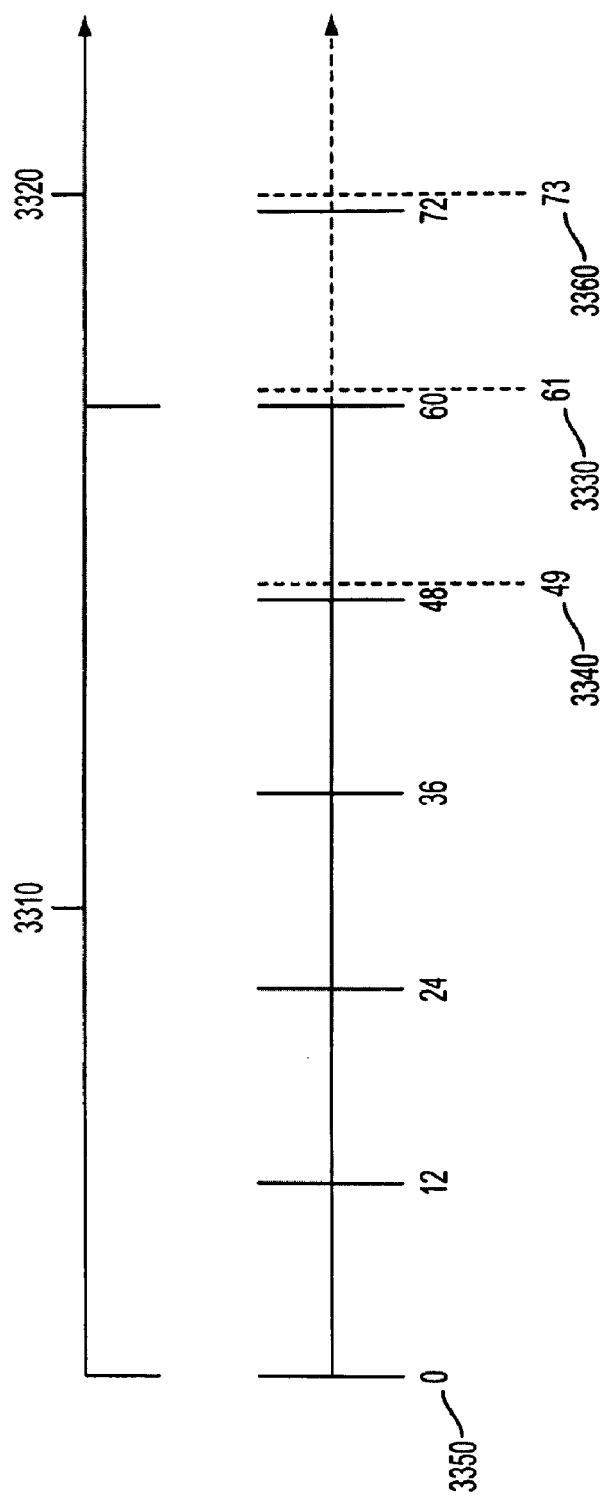
Figure 34:
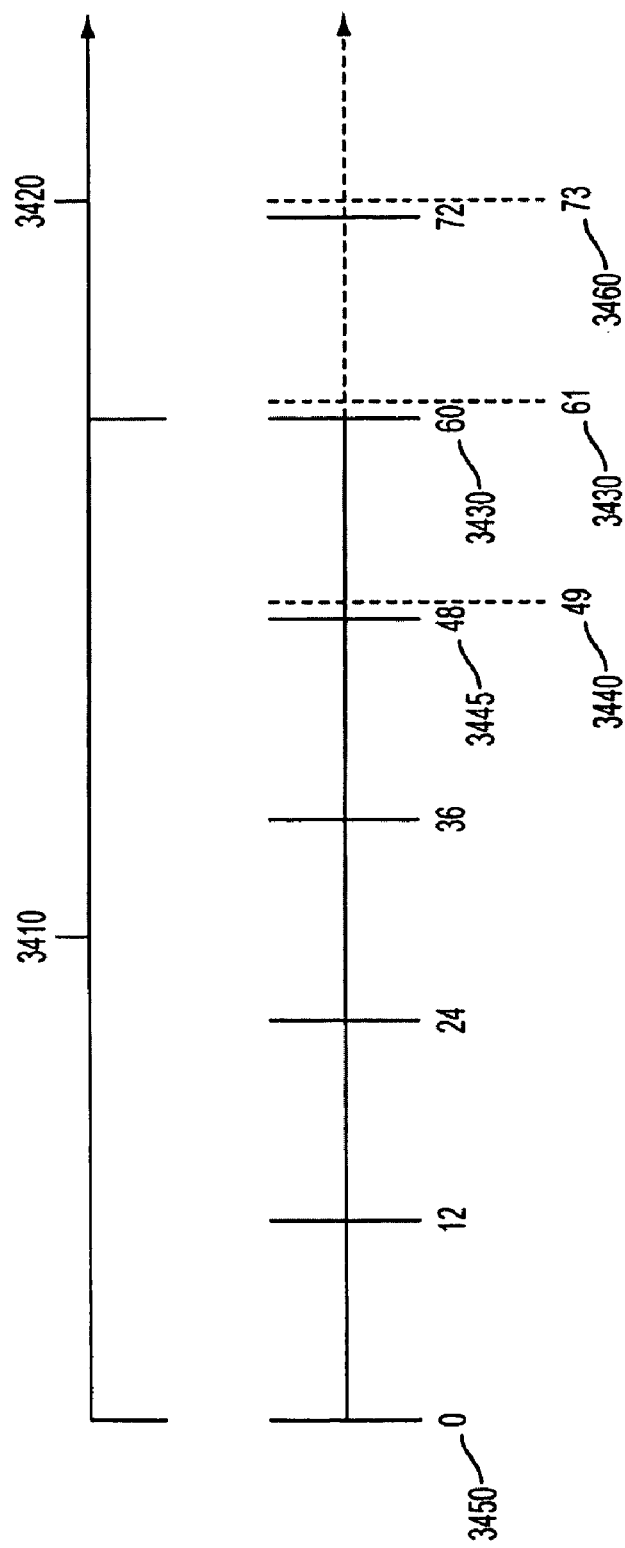
Figure 35:
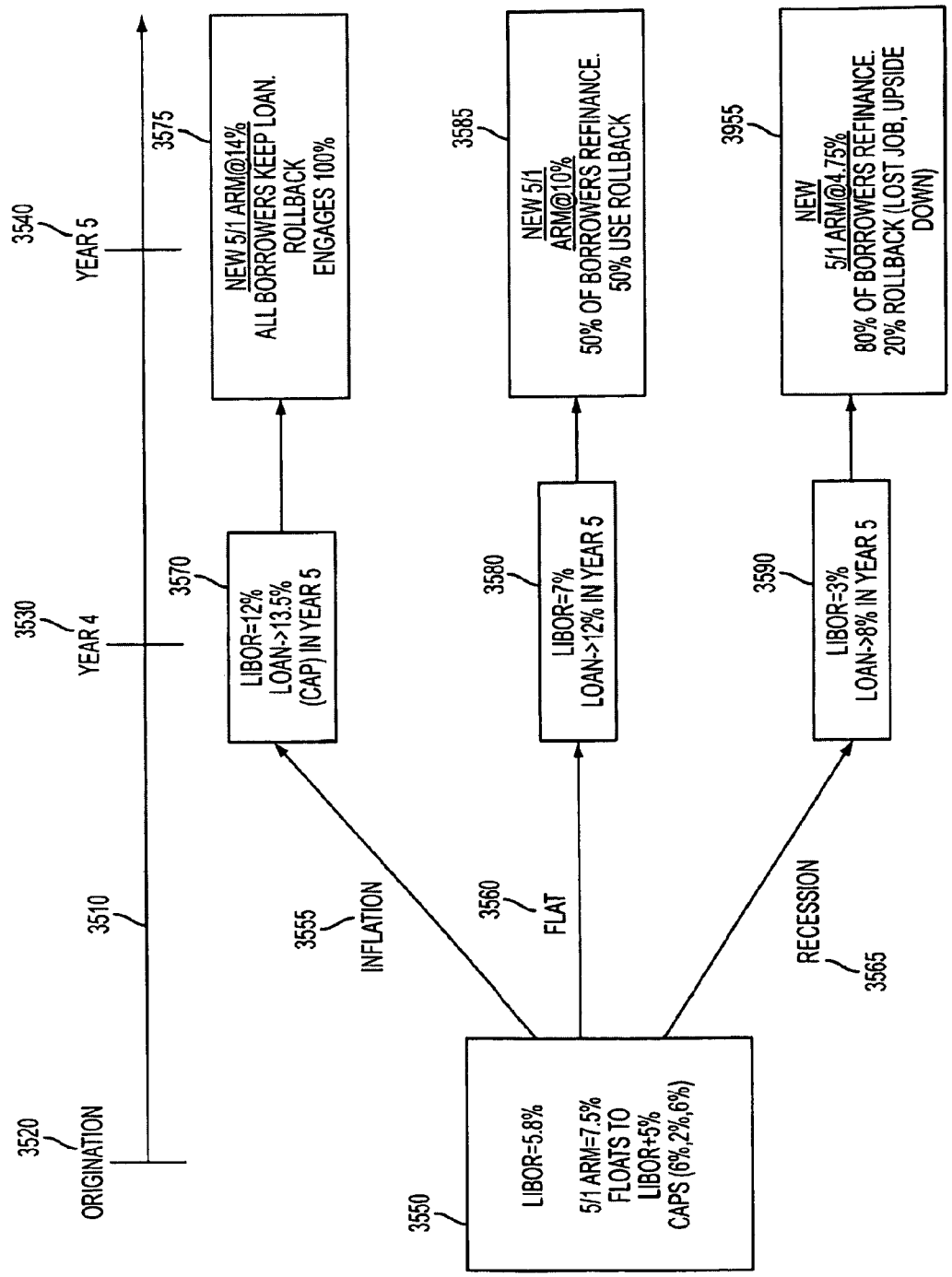

FIGS. 33-35 illustrate various forms of adjustable rate mortgages that may be provided in accordance with various embodiments of the invention.

DETAILED DESCRIPTION OF THE INVENTION

The following description includes many specific details. The inclusion of such details is for the purpose of illustration only and should not be understood to limit the invention. Moreover, certain features which are well known in the art are not described in detail in order to avoid complication of the subject matter of the present invention. In addition, it will be understood that features in one embodiment may be combined with features in other embodiments of the invention.

The potential of hardships and potential massive foreclosures in the real estate market as a result of heavy reliance on ARM financing and rising interest rates has caused real concern in both the financial and political communities.

In some embodiments, the present invention utilizes an interest rate cap. An interest rate cap (CAP) is a product that currently trades in an over-the-counter market (OTC). CAPs are financial derivatives that are used to protect against future increases in interest rates. Other derivatives that can be incorporated include, but are not limited to, options, forward contracts, futures and swaps. Futures are forward contracts that trade on an exchange. Options can trade on an exchange or OTC. The pricing of options (a future event determination) may be accomplished using the Black-Scholes formula. The Black-Scholes formula can be used to determine present pricing for an option that expires in the future based upon the probabilities of the possible future value of the contract including various arbitrage opportunities with a determination of both upside and downside opportunities. The Black-Scholes formula may be used for options on equities, and to price options on bonds and interest rate products.

In some embodiments, applying an interest cap to the residential market involves creating a new type of mortgage for the residential market that can hedge the interest rate risk in a variety of ways including using any suitable hedge such as a security commonly called an interest rate cap. This mortgage may be referred to as a residential interest rate cap mortgage (RIC) because it caps interest rates, or, preferably, as a custom hedged adjustable rate mortgage (CHARM) because the mortgage is not limited to use in combination with a security known as an interest rate CAP.

In some embodiments, the hedge may be part of a package with a mortgage or may be separate from the mortgage, and may be provided by any suitable entity to a borrower or a lender.

In some embodiments, the borrower may purchase the hedge from a third party. For example, the third party may be a division or subsidiary of a lender that deals in the securities market where such products are available. In other embodiments, the borrower may purchase the hedge from the lender. For example, the lender making the mortgage commitment may also be the provider of the hedge.

In some embodiments, the borrower may be able purchase the hedge and hold it for the term of the loan because the CAP may be included with a minimum interest rate (FLOOR) comprising a COLLAR. In other instances, the borrower may be able to give up the right to receive the lower rate on their adjustable rate mortgage, which can cause a reduction in the costs of the CAP to the borrower.

In accordance with the invention, the borrower may be able to turn its ARM into a "fixed-rate" loan through the use of hedges such as CAPS for the duration of the loan. This option may be exercisable by the borrower based upon his/her desire for certainty and the financial costs of such a solution. A borrower may want to buy stability for a period of time commencing when their rates will float and continuing to a period of time where the borrower believes some time in the future they will not be as concerned about the floating aspect of their mortgage.

The hedge, as will be shown, can be accomplished in myriad number of ways.

Referring to FIG. 1, examples of some of the types of financial hedges that a borrower may utilize in accordance with certain embodiments of the invention are displayed. Also shown are similar wholesale hedge mechanisms. The borrower may utilize many different types of financial products as a hedge or hedges. Examples presented are not intended to be exhaustive but should be used as examples of the type of products available. The hedge in the instant invention may be a financial instrument such as a forward or forwards, a future or futures, an option or options and a swap or swaps used alone or in combination among and with one another. These products may be used in conjunction with any suitable combination of one or more derivative products such as forward, future, option and swap contracts. The choice of hedge may be driven by availability and liquidity.

In some embodiments, the hedge may be a contractual agreement between the lender and the borrower for a variance of the interest rate according to a specific hedge provided by the lender. The lender, based on market conditions and its own internal projections of interest rates, may determine the cost of any particular hedge.

Figure 2:
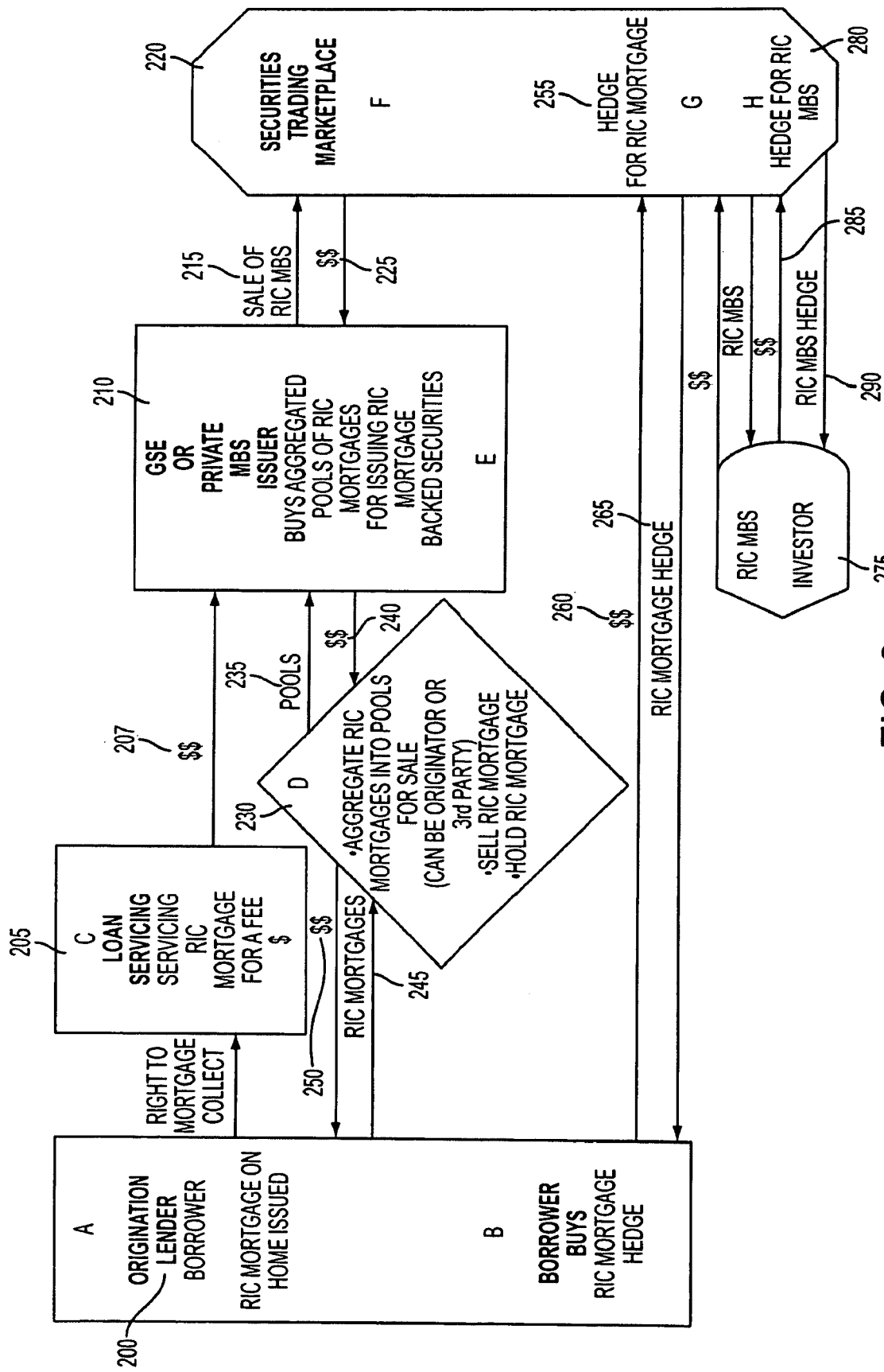
FIG. 2 illustrates a flowchart of a process intended for an implementation of a lender-provided RIC mortgage, as well as alternatives incorporated at various decision points along the way, for a lender to decide whether to hold the RIC mortgage, to pool the RIC mortgage and hold, or to sell the pool of hedged RIC mortgages, that may be provided in accordance with some embodiments of the present invention.

FIG. 2 illustrates a flowchart of a process intended for an implementation of a lender-provided hedge, as well as alternatives incorporated at various decision points along the way, for a lender to decide whether to hold a mortgage, to pool the mortgage and hold, or to sell the pool of hedged mortgages in accordance with the present invention. As shown, in some embodiments, a borrower may apply for RIC mortgage at step 200. For example, current mortgage lender compliant software and amended current mortgage software packages may be used by lenders to generate application and mortgage documents. After applying for a RIC mortgage, the available RIC mortgages for the borrower may also be determined at step 200. After the loan is issued, loan servicing may be accomplished by the initial lender or a third party provider of such services at step 205. The income from the mortgage payment, less the servicing fee may be sent, at step 207, to the holder of the RIC mortgage or to the issuer of the RIC MBS pertaining to that particular mortgage. The GSE or the private issuer of the mortgage backed securities may acquire mortgages in sufficient pool sizes, typically in pools greater than $1 million at step 210. In some instances, the issuer may sell the RIC MBS, at step 215, in the securities trading marketplace 220 and receive money for the RIC MBS, at step 225. Software may track the new RIC mortgages and RIC MBS products. In some instances, the GSE or the private issuer of the mortgage backed securities may sell the RIC mortgage directly to the borrower. In other instances, the GSE or the private issuer of the mortgage backed securities may sell the RIC mortgage to the lender who then sells the RIC mortgage to the borrower.

Generally, the securities trading marketplace 220 trades the issued RIC MBS among traders in a bid/ask over-the-counter marketplace. Software may track the new RIC mortgages and RIC MBS products.

In some embodiments, the lender has numerous options for handling the RIC mortgage. As shown, a decision point in the process may be presented to the lender, at step 230. In some instances, the lender may hold the RIC mortgage as part of its portfolio of investments. In other instances, the lender may aggregate the RIC mortgage into a pool or sell it to a third party as part of a pool of its own RIC mortgages that the third party aggregates into a larger pool of RIC mortgages. As an example, when selling the RIC mortgage to a private RIC mortgage pool, at step 235, the lender may receive money for the RIC mortgage, at step 240. In other instances, the lender may sell the individual RIC mortgage to a borrower. Also, the lender may purchase a RIC mortgage, at step 245, from a borrower who receives money for the RIC mortgage, at step 250.

In some embodiments, the borrower may buy the RIC mortgage hedge 255 directly from a securities trading marketplace. The hedge for the RIC mortgage 255 may be a product that is purchased and traded. It can be an existing hedge product or a new product or derivative. Software may track the new RIC mortgages and MBS products. Software may enable the borrower to obtain the cost of the hedge for a RIC mortgage 255. The buyer of the hedge for a RIC mortgage 255 may then send (e.g., transmit using software or send in the mail) money, at step 260, as payment for the hedge for the RIC mortgage 265. Software may also be used to create and issue the specific RIC mortgage hedge, at step 265, to the borrower.

In some embodiments, a RIC MBS investor may buy and sell hedges for a RIC MBS and a RIC MBS on a securities trading marketplace. Generally, the hedge for the RIC MBS and the RIC MBS are products that are purchased and traded. The hedge can be an existing hedge product or a new product or derivative. Software may track the new RIC MBS and RIC MBS products. For example, as shown, RIC MBS investor 275 may buy a hedge for RIC MBS 280. Buying a hedge for a RIC MBS may require using software to send money, at step 285, to the securities trading marketplace 220 and having software create and issue the specific RIC MBS, at step 290, to RIC MBS Investor 275. In some instances, this type of transaction may occur numerous times.

Figure 3:
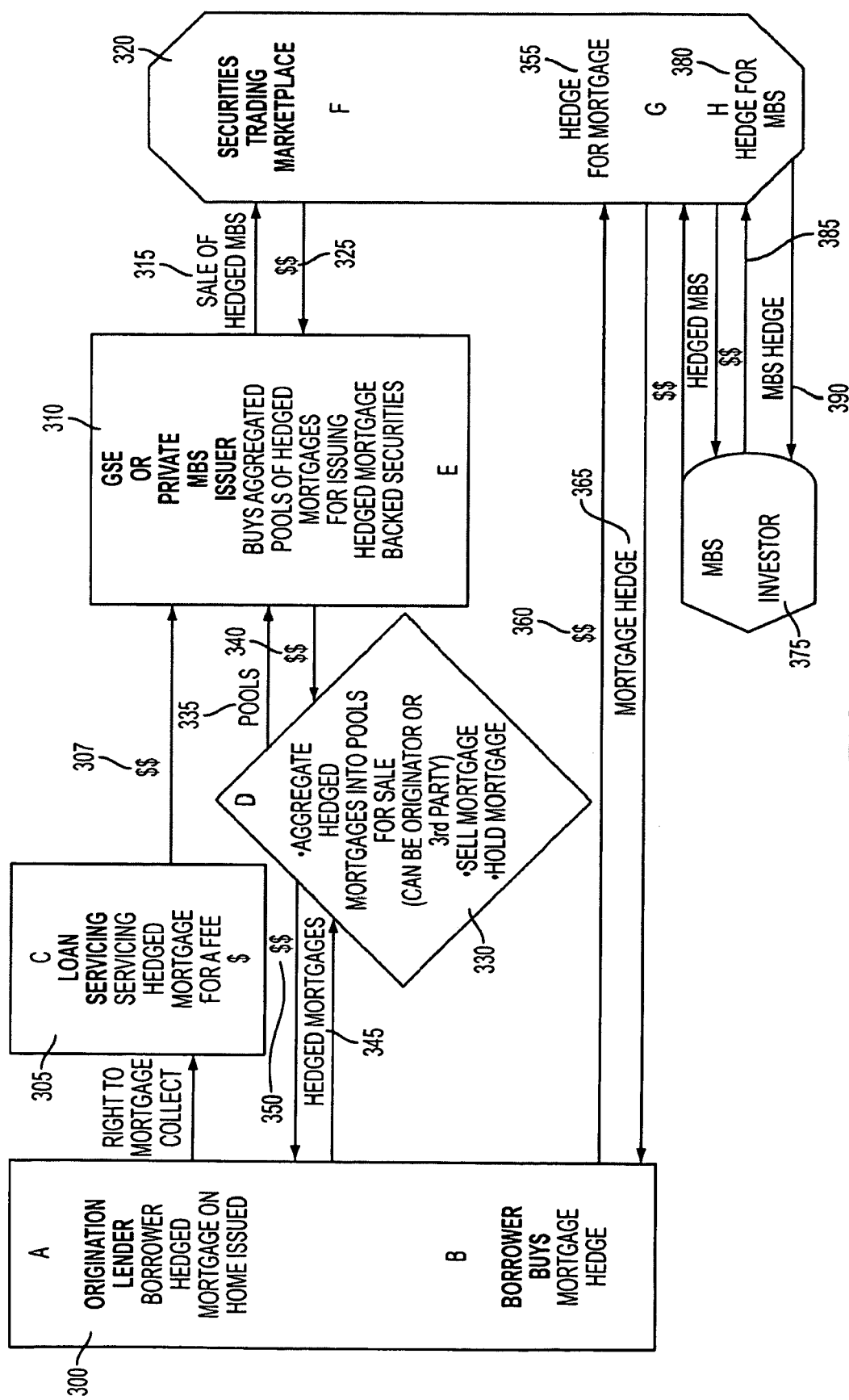
FIG. 3 illustrates a flowchart of a process intended for an implementation of a hedged mortgage, as well as alternatives incorporated at various decision points along the way, for a lender to decide whether to hold the hedged mortgage, to pool the hedged mortgage and hold, or to sell the pool of hedged mortgages, that may be provided in accordance with some embodiments of the present invention.

Referring to FIG. 3, an illustration of a flow chart of a process intended for the an implementation of a hedged mortgage, as well as alternatives incorporated at various decision points along the way, for a lender to decide whether to hold a hedged mortgage, to pool the hedged mortgage and hold, or to sell the pool of hedged mortgages is shown.

In some embodiments, a borrower may apply for a hedged mortgage as shown at step 300. This may be accomplished, for example, using current mortgage lender compliant software and amended current mortgage software packages to generate application and mortgage documents. After applying for a hedged mortgage, the available hedged mortgages for the borrower may also be determined at step 300. After a loan is issued, loan servicing may then be accomplished by the initial lender or a third party provider of such services at step 305. The income from the mortgage payment less the servicing fee may be sent, at step 307, to the holder of the hedged mortgage or to an issuer of the hedged MBS pertaining to that particular mortgage. A GSE or a private issuer of the mortgage backed securities may acquire mortgages in sufficient pool sizes, for example, in pools greater than $1 million, at step 310. In some instances, the issuer sells the hedged MBS, at step 315, in the securities trading marketplace 320 and receives money for the hedged MBS, at step 325. Software may track the new hedged mortgages and hedged MBS products. In some instances, the GSE or the private issuer of the mortgage backed securities sells the hedged mortgage directly to the borrower. In other instances, the GSE or the private issuer of the mortgage backed securities sells the hedged mortgage to the lender who then sells the hedged mortgage to the borrower.

The securities trading marketplace 320 may trade the issued hedged MBS among traders in a bid/ask over-the-counter marketplace. Software may track the new hedged mortgages and hedged MBS products.

In some embodiments, the lender has numerous options for handling the hedged mortgage. As shown, a decision point in the process is presented to the lender, at step 330. In some instances, the lender may hold the hedged mortgage as part of its portfolio of investments. In other instances, the lender may aggregate the hedged mortgage into a pool, or sell it to a third party as part of a pool of its own hedged mortgages that the third party aggregates into a larger pool of hedged mortgages. As an example, when selling the hedged mortgage to a private hedged mortgage pool, at step 335, the lender may receive money for the hedged mortgage, at step 340. In other instances, the lender may sell the individual hedged mortgage to a borrower. Also, the lender may purchase a hedged mortgage, at step 345, from a borrower who receives money for the hedged mortgage, at step 350.

In some embodiments, the borrower buys the hedged mortgage hedge directly from a securities trading marketplace. The hedge for the hedged mortgage 355 may be a product that is purchased and traded. It can be an existing hedge product or a new product or derivative. Software may track the new hedged mortgages and MBS products. Software may enable the borrower to obtain the cost of the hedge for a hedged mortgage 355. The buyer of the hedge for a hedged mortgage 355 may then send (e.g., transmit using software or send in the mail) money, at step 360, as payment for the hedge for the hedged mortgage at step 365. Software may also create and issue the specific hedged mortgage hedge, at step 365, to the borrower.

In some embodiments, a hedged MBS investor may buy and sell hedges for a MBS and a hedged MBS on a securities trading marketplace. The hedge for the MBS and hedged MBS may be purchased and traded. The hedge can be an existing hedge product or a new product or derivative. Software may track the new hedged mortgages and hedged MBS products. For example, as shown, hedged MBS investor 375 may buy a hedge for MBS 380. Buying a hedge for an MBS may require using software to send money, at step 385, to the securities trading marketplace 320 and having software create and issue the specific hedged MBS, at step 390, to the hedged MBS Investor 375. In some instances, this type of transaction may occur numerous times.

Figure 4:
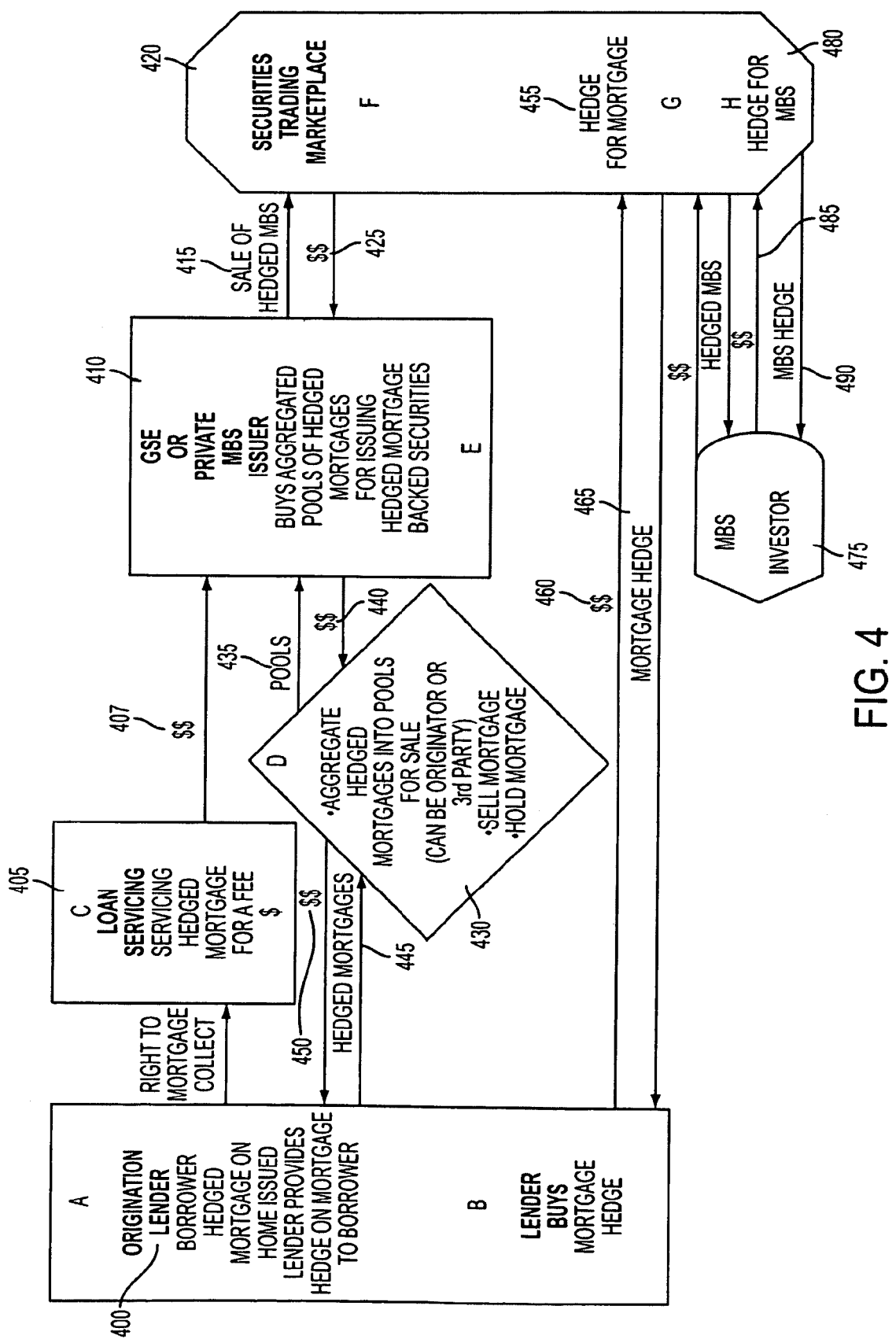
FIG. 4 illustrates a flowchart of a process intended for an implementation of a lender-provided hedged mortgage, as well as alternatives incorporated at various decision points along the way, for a lender to decide whether to hold the lender provided hedged mortgage, pool the lender-provided hedged mortgage and hold, or to sell the pool of lender-provided hedged mortgages, that may be provided in accordance with some embodiments of the present invention.

Referring to FIG. 4, an illustration of a flowchart of a process intended for an implementation of a lender-provided hedged mortgage, as well as alternatives incorporated at various decision points along the way, for a lender to decide whether to hold the lender-provided hedged mortgage, to pool the lender-provided hedged mortgage and hold, or to sell the pool of lender-provided hedged mortgages is shown.

In some embodiments, a borrower may apply for a lender-provided hedged mortgage at step 400. This may be accomplished, for example, using current mortgage lender compliant software and amended current mortgage software packages to generate application and mortgage documents. After applying for a lender-provided hedged mortgage, available lender-provided hedged mortgages for the borrower may also be determined at step 400. After a loan is issued, loan servicing may be accomplished by the initial lender or a third party provider of such services at step 405. The income from the mortgage payment less the servicing fee may be sent, at step 407, to the holder of the lender-provided hedged mortgage or to an issuer of the lender-provided hedged MBS pertaining to that particular mortgage. A GSE or a private issuer of the mortgage backed securities may acquire mortgages in sufficient pool sizes, for example, in pools greater than $1 million, at step 410. In some instances, the issuer sells the lender-provided hedged MBS, at step 415, in the securities trading marketplace 420 and receives money for the lender-provided hedged MBS, at step 425. Software may track the new lender-provided hedged mortgages and lender-provided hedged MBS products. In some instances, the GSE or the private issuer of the mortgage backed securities sells the lender-provided hedged mortgage directly to the borrower. In other instances, the GSE or the private issuer of the mortgage backed securities sells the lender-provided hedged mortgage to the lender who then sells the lender-provided hedged mortgage to the borrower.

The securities trading marketplace 420 may trade the issued lender-provided hedged MBS among traders in a bid/ask over-the-counter marketplace. Software may track the new lender-provided hedged mortgages and lender provided hedged MBS products.

In some embodiments, the lender has numerous options for handling the lender-provided hedged mortgage. As shown, a decision point in the process may be presented to the lender, at step 430. In some instances, the lender may hold the lender-provided hedged mortgage as part of its portfolio of investments. In other instances, the lender may aggregate the lender-provided hedged mortgage into a pool or sell it to a third party as part of a pool of its own lender-provided hedged mortgages that the third party aggregates into a larger pool of lender-provided hedged mortgages. As an example, when selling the lender-provided hedged mortgage to a private lender-provided hedged mortgage pool, at step 435, the lender may receive money for the lender-provided hedged mortgage, at step 440. In other instances, the lender may sell the individual lender-provided hedged mortgage to a borrower. Also, the lender may purchase a lender-provided hedged mortgage, at step 445, from a borrower who receives money for the lender-provided hedged mortgage, at step 450.

In some embodiments, the borrower buys the lender-provided hedged mortgage hedge directly from a securities trading marketplace. The hedge for the lender-provided hedged mortgage 455 may be a product that is purchased and traded. It can be an existing hedge product or a new product or derivative. Software may track the new lender-provided hedged mortgages and MBS products. Software may enable the borrower to obtain the cost of the hedge for a lender-provided hedged mortgage 455. The buyer of the hedge for a lender-provided hedged mortgage 455 may then send (e.g., transmit using the software or send in the mail) money, at step 460, as payment for the hedge for the lender-provided hedged mortgage at step 465. Software may also create and issue the specific lender-provided hedged mortgage hedge, at step 465, to the borrower.

In some embodiments, a lender-provided hedged MBS investor may buy and sell hedges for a lender-provided MBS and a lender-provided hedged MBS on a securities trading marketplace. The hedge for the lender-provided MBS and the lender-provided hedged MBS may be purchased and traded. It can be an existing hedge product or a new product or derivative. Software may track the new lender-provided hedged mortgages and lender-provided hedged MBS products. For example, as shown, lender-provided hedged MBS investor 475 may buy a hedge for lender-provided MBS 480. Buying a hedge for lender-provided hedged MBS may require using software to send money, at step 485, to the securities trading marketplace 420 and having software create and issue the specific lender-provided hedged MBS, at step 490, to the lender-provided hedged MBS investor 475. In some instances, this type of transaction may occur numerous times.

In some embodiments, the lender may have the options of buying hedges for all the mortgages, of hedging a percentage of a particular pool or portfolio of hedged mortgages, of doing nothing and holding the fees paid by the borrower for the hedge, or investing the fees in alternative instruments, or of doing some combination of all of these options depending on the lender's desire to hedge or speculate, and the lender's views on the direction and volatility of future interest rates.

In this alternative, hedged mortgages may be pooled by the lender for sale to a government-sponsored enterprise (GSE) or external investor. For example, approximately 50% of current mortgages are pooled and sold as mortgage-backed securities or pass-through securities as conforming to Fannie Mae and Freddie Mac. Non-conforming loans may be pooled and sold privately in the market, but a smaller percentage of these loan may get securitized because they do not have the full faith and credit of the US Government behind them. Mortgages referred to herein may be either conforming or nonconforming.

Conformity of mortgages may involve both economic and political factors. Fannie Mae and Freddie Mac determine the conformity of mortgages. While the instant invention preferably results in a more stabile interest rate environment, and as a result a more stabile mortgage environment, there is no guarantee that Fannie Mae and Freddie Mac would deem the CHARM a conforming loan.

In one alternative, a lender may guarantee the difference between the yield on the pool of CHARM loans and the yield of a similarly sized pool of ordinary ARM loans. By acting as a guarantor, a bank can leverage its information and forecasts about future rates together with its contacts in the derivatives market to profitably market a guaranteed CHARM MBS. Because of the reduced default risk, reduced prepayment risk, and elimination of the effect of the hedge on the investor, a guaranteed CHARM is an improved security over a MBS based on ordinary ARMs.

Figure 5:
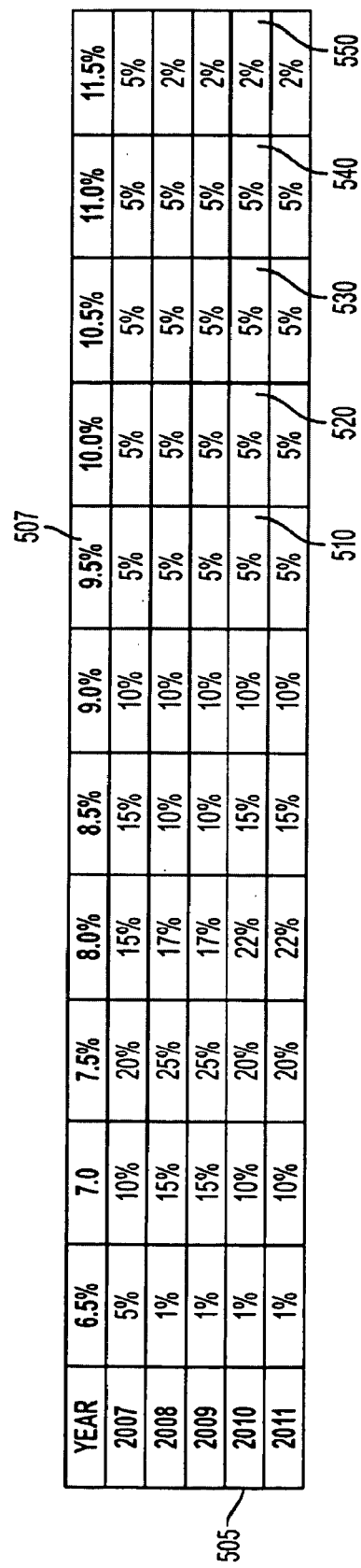
FIG. 5 illustrates a model for predicting future interest rates that may be provided in accordance with some embodiments of the present invention.

The next example will illustrate how the bank can use its forecasting models and derivatives trading opportunities to create different risk-return scenarios when guaranteeing a CHARM pool or MBS. Let us assume a $100 million dollar pool of mortgages with a contractual interest rate cap of 9%, where initially the lender has taken the risk on reducing the interest rate for some period of time. For sake of example, and not by way of limitation, assume that the pool contains all ARM loans with a 3 year fixed rate of 6.5% and a variable rate, determined annually beginning with year 4, that can range from 1.5%-11.5%. The cap of 9% provided offers consumers additional protection in years 4 and 5 while still allowing exposure to lower rates. The example assumes that the lender can determine the probability for future interest rates for the next five years, for example by using a table for a cap of 9% as illustrated in FIG. 5. An event tree could also be substituted for a table like that of FIG. 5.

Using such a table, a lender can estimate the statistically expected, or average, cost of offering the 9% cap. It will be understood that, although the interest rate model shows interest rates from 6.5%-11.5%, it may show any range of interest rates (e.g., 1.5%-11.5%, 0%-50%, etc.). In year 4 (2010), as shown by row 505, the probability that the hedge will be called upon to reduce the interest rate from 9.5% to 9%, as shown by column 507, is 5%, as shown by cell 510, from 10% to 9% is also 5%, as shown by cell 520, from 10.5% to 9% is 5%, as shown by cell 530, from 11% to 9% is 5%, as shown by cell 540, and from 11.5% to 9% is 2%, as shown by cell 550. The expected cost for year 4 may then be calculated in some embodiments as the sum of the products of the probabilities and the interest reductions:

$$(0.5\% \times 0.05) + (1.0\% \times 0.05) + (1.5\% \times 0.05) + (2\% \times 0.05) + (2.5\% \times 0.02) = 0.025\% + 0.05\% + 0.075\% + 0.10\% + 0.05\% = 0.30\%.$$

Other cost determination techniques may additionally or alternatively be used.

The lower the interest rate cap and the higher the interest rate potential, the longer the string of numbers required to produce the expected cost. For example, determining the expected cost for a RIC at 6.5% with a potential rate of 11.5% requires the sum of the products of the probabilities and the interest reductions between 6.5%-11.5%.

Because the probability model for year 5 is the same as year 4 in this example, the expected cost for year 5 will involve the same series of multiplications and additions and, in the example, will also be 0.30%. The cost of the hedge may then be given by the present value of the costs in year 4 and 5, which will be a number less than 0.60%. The dollar value of the cost may be found by multiplying the percentage cost times the remaining mortgage loan balance. So, for a $500,000 loan and a hedge costing 0.60%, the dollar cost is 0.60%× $500,000=$3,000. The lender may add a fee or commission to the cost, in order to attempt to make a profit on average. So, for a hedge costing 0.60% the lender might choose to charge 0.75% or any other suitable amount.

The lender can use a projection beyond five years to whatever term it wishes, or less of a time period than above, to calculate costs and determine risk. The lender can determine the cost of a single mortgage or a pool of mortgages.

Continuing with the above example, assume the following facts: the lender takes a series of $300K mortgages and pools them in a $100 million traunch (i.e., 334 mortgages) where the mortgages have a contractual cap at 11.5%. The borrowers pay a fee of 0.75% to buy down 2.5% of maximum interest rates from years 2010 and 2011. The lender looks at the probabilities from the table of FIG. 5 to forecast the rates. The lender has pooled mortgages that could go to 11.5%, but the lender has a contractual obligation not to receive more that 9% in interest from the borrower for years 2010 and 2011.

Models of future interest rates may also be determined based on: stochastic modeling of only the relevant short-term rate; pure diffusion (Black's equation); mean—reverting [$dr = (a+br) dt + \sigma r\gamma dZ$]—there are several alternative models for setting a, b, sigma ($\sigma$), and gamma ($\gamma$) (see list of eight popular models cited in Chan, Karolyi, Longstaff, and Sanders J. Finance 47(3), 1992, p. 1211 (which is hereby incorporated by reference herein in its entirety)); HJM model—Stochastic modeling of the entire yield curve; and the Epstein-Wilmott model.

Based on these facts, the lender may be able to sell this pool of loans to an investor with the CAP obligation intact, meaning that the investor would receive a maximum of 9% even if current rates indicated a higher amount such as 10% or 11.5%. An alternative that may attract more investors would be for the bank to guarantee the difference between the 9% cap rate and the standard ARM rate (e.g., that may go as high as 11.5%). In this case, the risk of 2.5%/yr for years 4 and 5, or as much as $5 million on a $100 million pool, is no longer merely an opportunity risk but an actual risk for the guaranteeing bank. The investor will not face the 2.5% risk directly, but will face only the risk that the bank may default.

The guaranteeing bank in the example has some choices to make in deciding to accept the risk itself versus buying a wholesale CAP in the derivatives market. The bank can decide to accept the 0.75% fee from borrowers and not hedge. If interest rates stay below 9% in both years, the bank will have a profit of 0.75%×$100 million×2=$1.5 million. But if interest rates rise to 11.5% in both years, then the bank will receive $1.5 million in revenue but lose $5 million on the guarantee for a net loss of $3.5 million. All manner of possibilities between these two numbers also exist. Now suppose the bank can buy a 10% wholesale CAP in the derivatives market for year 4. It will have to pay an up-front fee for this protection. The bank can compare this up-front fee to the expected value under its own probability forecast. If the numbers are close, then the bank might choose to buy the 10% CAP to reduce, though not eliminate, the risk of loss. A more cautious bank might want to buy a 9.5% or a 9% CAP. A more speculative bank might decide to buy a 10.5% CAP or no cap at all.

The lender may have a choice in determining its guarantee and the hedge position of its guarantee, which may or may not be disclosed to a specific pool of mortgages. The CHARM pool may present a low probability of default and/or refinancing risk associated with current MBS. That greater stability may cause the CHARM MBS to trade at a premium over a non-CHARM pool. The instant invention contemplates both scenarios where the lender guarantees the highest possible rate and where the effective interest rate is reduced. Obviously, there are hybrids possible that can vary by either time rate or both. The pool can have a varying rate depending on time, and/or have a varying rate depending on the guarantee or hedge involved in the pool.

In some embodiments, the Black-Scholes methodology could also be used to generate the probabilities from a set of forward rates and forward implied volatilities. Other types of real or risk-neutral interest rate modeling could be used, such as a mean-reverting model or the yield curve model of Heath, Jarrow, and Merton. It may be prudent for the bank to consider ARM default or delinquency risk as a means of scaling from demanded ARM rates to yields actually paid by borrowers (e.g., when the loan demands 11%, if only 90% of borrowers pay, then the effective rate for the lender may only be 90%× 11%=9.9%).

The process set forth above is but one way to accomplish this aspect of the invention. An alternate example hedge may be a residential interest cap of 8% on a loan based on 3 or 6 month LIBOR for a specified future period. Another example could be a contract whereby, for an upfront fee, there is the option of a second fixed period available after the initial fixed rate expires. Yet another example could lock in a second future fixed rate period for an ARM in exchange for the borrower agreeing to pay the lender a hedge termination value, based on future rates, in the event that interest rates fall and the loan is prepaid or defaulted upon. Another example could allow the rate to be determined as the lowest index rate available from the previous 12 months instead of the index rate at the loan anniversary. Still another example could allow the borrower, for a fee, to change the index determining their loan among the 6 mo LIBOR, 1 year CMT, the 30 year T-Bill with specified adjustment margins added to the indexes to get the mortgage loan rate.

In an alternative embodiment, the creation of a CHARM may be by way of a contractual hedge between the borrower and the lender so that the borrower has an improved position qualifying for a particular loan. This could cause an improved environment in the sub-prime mortgage market, where borrowers that are viewed to have a greater risk for default because of their credit histories are charged significantly higher interest rates. The high sub-prime rates are essentially acting for the lenders as a hedge to cover the anticipated rate of default. The CHARM invention can be implemented in the sub-prime market and potentially reduces both the interest rate paid and the default rate/risk inherent in that market. Additionally, the use of CHARMs in the sub-prime market could reduce the political scrutiny that such high interest rates cause for lenders. Loss-leader hedges in a CHARM loan could also be offered as an inducement or a renegotiation tool for borrowers in ARMs that may be in danger of defaulting.

In some embodiments, the initial two-person hedge structure has definite advantages to the residential borrower over a third-party hedge. Because the hedge is initially implemented as a contract between the borrower and lender, the borrower need not worry about counterparty risk—that is, the risk that a third party providing the hedge will not make the payment that the borrower needs to cover his additional interest cost. There is no third party as far as the borrower is concerned. Therefore, even if the loan is sold to a new lender, the borrower only owes the amount determined by the hedge clauses in his loan contract. Also, it is possible that a contractual borrower-lender hedge that is part of a loan will have tax advantages over a third-party hedge. A contractually hedged loan where the interest rate varies is a variable cost for the owner. Advantages to the lender of the contractual hedge approach include logistical advantages and reduced customer support costs, and the ability of the lender (or a subsidiary of the lender) to sell hedges that are liquid in the marketplace.

In some embodiments, if a lender or other beneficial holder of the note wishes to involve a third party as part of their risk management scheme, it does not affect the borrower. For example, a lender may purchase an interest rate cap on a $100 million principal from a third party in the over-the-counter market and then make two hundred $500K home CHARM loans with a cap feature. Only the CHARM lender is exposed to the risk that the third party does not deliver on the cap. The CHARM borrowers have an obligation only to pay the capped rates, no matter who may end up owning the loan.

Alternatively, in some embodiments, the instant invention contemplates that two methods for customization of the hedge are: lender-customized and borrower-customized. In the lender-customized CHARM, there may be a single hedge or series of hedges attached to mortgages offered to borrowers. The exact terms of the hedge may be determined by the lender. This allows the hedge to be standardized and a large number of mortgages written with identical terms. The identical terms make it easier to pool the mortgages and make it easier for loan servicing firms to make adaptations to their software necessary for sending out the loan and dealing with loan servicing issues such as correspondence from borrowers.

In some embodiments, in a borrower-customized CHARM, the hedge can be chosen by the borrower from a catalog or a schedule maintained by the lender or a third party. Hedges may have monthly or yearly buy and sell dates and buy and sell values, facilitating the borrower who would like to change from one hedging scheme to another without the hassle of refinancing the mortgage. The variable terms increase the difficulty of servicing and aggregating the hedged mortgages. At the pooled level some of the variations in borrower's strategies may average out. It is certainly possible to design pools where this will happen automatically, through the use of internal markets. However, the added convenience to borrowers may generate fees that can compensate for the costs involved in servicing and aggregating the loans.

In some embodiments, in the secondary market, the CHARM can be treated in several ways and which is the best way may vary as market practices evolve. Initially, the hedges may follow the loan unless the loan is guaranteed by a bank or a third party. In that way, the loan can be packaged into a pool. The investor considering the purchase of such a pool is likely to be sophisticated. The secondary marketplace will determine whether it is better for banks to guarantee the hedges and include such guarantees into pools or whether such guarantees are unnecessary, in which case lending banks and then pool investors take the risk initially. This initial assignment of risk at the pool level can be further modified using standard interest rate derivatives such as swaps, swap options, caps, floor, and collars by either the original lender, a later guarantor, or an investor investing for their own account.

Referring back to FIG. 1, a correspondence between several well known wholesale derivative products (e.g., swaps, swap options, caps, floors and exotics) and products that could be offered to consumers as part of a CHARM loan is illustrated. This list of hedges is not meant to be exhaustive, nor is it implied that the consumer product must by necessity be created by first purchasing or later hedging with the associated wholesale product. The flexibility of the CHARM framework simply implies that short positions in the associated wholesale products can be entered into by a lender by selling the related consumer hedges. The existence and liquidity of wholesale or over-the-counter markets may become a driving force making some hedges (like swaps or caps) more acceptable with lenders than others (based on the less-liquid exotics), but it does not reduce the potential flexibility of the CHARM framework as a financial tool. The CHARM loan is a financial tool with various hedges that has alternative uses. For example, the cap hedge may be most useful for new home builders who wish to partner with a bank and bundle the cost of a cap into the price of new construction in order to enable average consumers to obtain initially safe, low-rate financing. The rate lock hedge may be most useful to high income consumers who cannot afford the possibility of rates moving up 5% but who do not mind paying to eliminate the hedge if interest rates go down. The other hedges can be used depending on the amount and kinds of risks acceptable to the consumer.

In various embodiments, the CHARM loan offers a system by which loan terms can be found that best match the needs of lender and borrower, and evolve over time as market conditions change. The CHARM loan may offer a conduit for any type of known or foreseeable interest rate derivative product to be offered to homeowners. In some embodiments, it may be possible to only provide some products in some jurisdictions or to particular kinds of clients.

In some embodiments, computer software may be used to facilitate the transactions that are exhibited in FIGS. 1-5. The software may be executed in a processor and display information on a display that is part of any suitable computing device, such as a laptop, personal digital assistant, server, etc. In some embodiments, a software system contemplating multiple combinations of software components may be provided to meet the transaction needs of the market place for the new methods, systems and products that result from the instant invention. It is to be understood that FIGS. 1-5 are mere examples of processes that may be performed in some embodiments.

In some embodiments, the borrower's information may be entered in a computer program within a computer system within a lender. Any suitable computer may be used. The standard information a lender may input for a borrower may be used to determine the mortgage commitment that a borrower can obtain from the particular lender. In one example, the loan is an ARM with which the lender offers a contractual hedge. In an alternative, the lender can inform the borrower that a third-party hedge vehicle is offered that can potentially minimize future interest rate risk for the borrower. Also, the lender can offer choices of its own contractual hedges and third-party hedges.

In some embodiments, the lender may use the computer system that processes the borrower's information to determine the loan and the potential hedges. In one instance, the third party may be able to have its hedge choice or choices fed into the lender directly and be provided to the borrower. The computer system can be owned by the lender or a service provided to the lender in whole, in part or in some combination with others. If the borrower buys a particular hedge, then the loan may be designated as hedged, or a CHARM, and could be pooled together with other loans of the same type as noted above and held or sold by a lender. The lender may designate, or there could be an industry standard that designates, the loan as being hedged (there also could be both a lender designation and a industry designation separately or in combination that could designate the type of loan, hedge and the lender).

In some embodiments, the information generated from the calculations of the various hedges and resulting mortgages may be provided to lenders via a distributed computer system, the Internet, via fax, via hard copy or any combination the same. The distribution of the CHARM-related data could result in a broad acceptance of CHARM products and provide a service to lenders where the data enable them to more accurately determine the risk and the marketplace. Alternatively, the calculation and information can be customized for particular lenders and the hedge calculation, whether contractual or a third-party hedge, would be provided to a lender via a distributed computer system, the Internet, via fax, via hard copy or any combination of the same.

In some embodiments, as the market for CHARM mortgages and the secondary market for CHARM MBS develop, a listing of daily CHARM indexes that may reflect the arithmetic average price for each CHARM product for the previous business day may be provided. The prices may be derived from polling several lenders and banks. These CHARM indices can supply price transparency, alone or as a basket of indices, to both lenders and borrowers. The indices can also be used as a basis for trading in the secondary market as a derivative that would be reflective of various MBS. A particular index or groups of indices may trade in a manner that is similar to the trading of current interest rate indices in the various securities markets around the world. In some embodiments, derivatives of the hedges for CHARM MBS, or the CHARM MBS itself may also be traded in the securities markets. Additionally, a derivatives market for CHARM MBS and CHARM indices that are similar to the US. Treasury market, other sovereign debt and/or the corporate bond market, etc., may be provided.

In some embodiments, a living mortgage document that looks at a mortgage as a living financial product like a 401(k) account and that fits the overall CHARM concept may be provided. This document may illustrate each quarter (or other period) what one would potentially be paying based upon available payment plan choices, as well as any number of a borrower's actual payment and payment plan choice. In this way, the document may illustrate that, while one could be paying on an ARM based on LIBOR, they could switch to a new index or extend the fixed period, change to interest only, swap rates for a period of time, take advantage of all combinations and choices so that the mortgage never really has to be refinanced per se. The mortgage in the alternative could even be portable because the borrower may have made a profit within the mortgage payment plan choices over the years by using a series of derivatives as hedges. In addition to any increase in the value of the underlying real estate, the borrower could have profit within its mortgage because of shrewd financial choices. Also, the CHARM mortgage could also provide an open period where the borrower can change their option once per year or any other suitable period. In some embodiments, there could be a subscription mode where a particular payment plan can be optioned for a period, and it would only go in effect when the option was exercised. For example, the option could be an additional payment of $25 per month or $300 per year or a total fee up-front of $1500 for the total fixed period of a 5 year ARM. In the alternative, in the event the option is never taken, the payment can come from appreciation. The mortgage document may incorporate these features up-front at execution and disclosure. Other features could be an appreciation credit line based on a formula that could be used to determine what one would pay for the cap or could let the borrower use the line for investments in securities.

Figure 6:
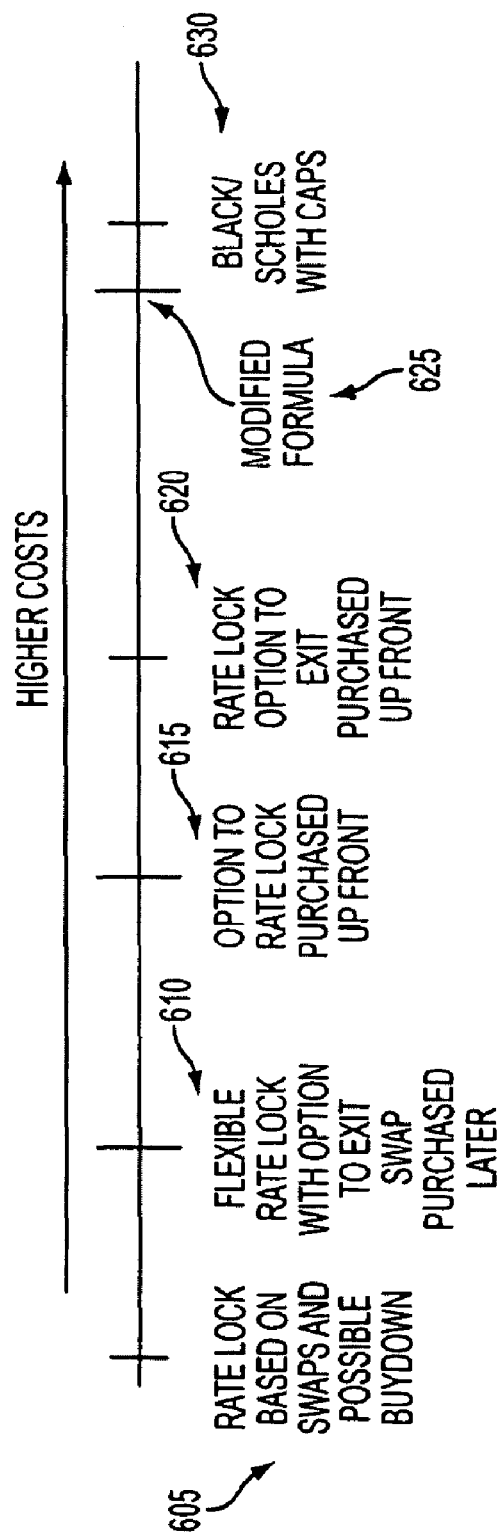
FIG. 6 illustrates a line plot of consumer protection from higher rates based on products, costs, and benefits that may be provided in accordance with some embodiments of the present invention.

Referring to FIG. 6, an illustrative chart demonstrates consumer protection from higher rates based on products, costs, and benefits. As shown, moving from left to right on the line plot indicates higher costs. In this example, six products are demonstrated, however any number could be considered. The first product, "rate lock based on swaps and possible buydown" 605, may exhibit the lowest cost. "Rate lock based on swaps and possible buydown" 605 may be competitive with existing rates but has downside risk of potentially being exposed to higher interest rates. The second product, "flexible rate lock with option to exit swap purchased later" 610, may exhibit the second lowest cost. "Flexible rate lock with option to exit swap purchased later" 610 may reduce the late occurring downside risk. The third product, "option to rate lock purchased up front" 615, may exhibit the third lowest cost. "Option to rate lock purchased up front" 615 may eliminate the early downside risk. The fourth option, "rate lock option to exit purchased up front" 620, may exhibit the third highest costs. "Rate lock option to exit purchased up front" 620 may eliminate all downside risk. A fifth product may exist, "modified formula" 625, which may exhibit the fifth highest cost. A modified formula may eliminate all downside risk or never have any downside risk. The sixth product, "Black/Scholes with Caps" 630, may exhibit the highest cost. "Black/Scholes with Caps" 630 may never have any downside risk and the consumer may benefit from lower rates if rates fall.

In FIGS. 7-32, an illustrative computer interface demonstrates comparing and selecting a hedged mortgage as shown. Referring to FIGS. 7-16, the user may compare and select a desired CHARM. In some embodiments, comparing and selecting a desired CHARM may require that the user enter a number of variations (e.g., loan amount 710, fully amortized schedule 715, loan start rate 720, start-rate amortization 725, first rate reset date 730, loan reset rate 735, LIBOR index 740, loan reset amortization (unprotected) 745, preferred CHARM rate 750, CHARM amortization 755, etc.). Variations may be provided in a library of alternatives (e.g., pull down menus, lists where data is populated, etc.) or alternatives may be entered in by the user (e.g., text typed into a field box). It will be apparent that each of the variations/alternatives presented may be combined or further separated providing the user with less or more variations/alternatives. Further, in some embodiments additional variations/alternatives may be required. In some instances, not all of the aforementioned variations/alternatives are required.

Figure 7B:
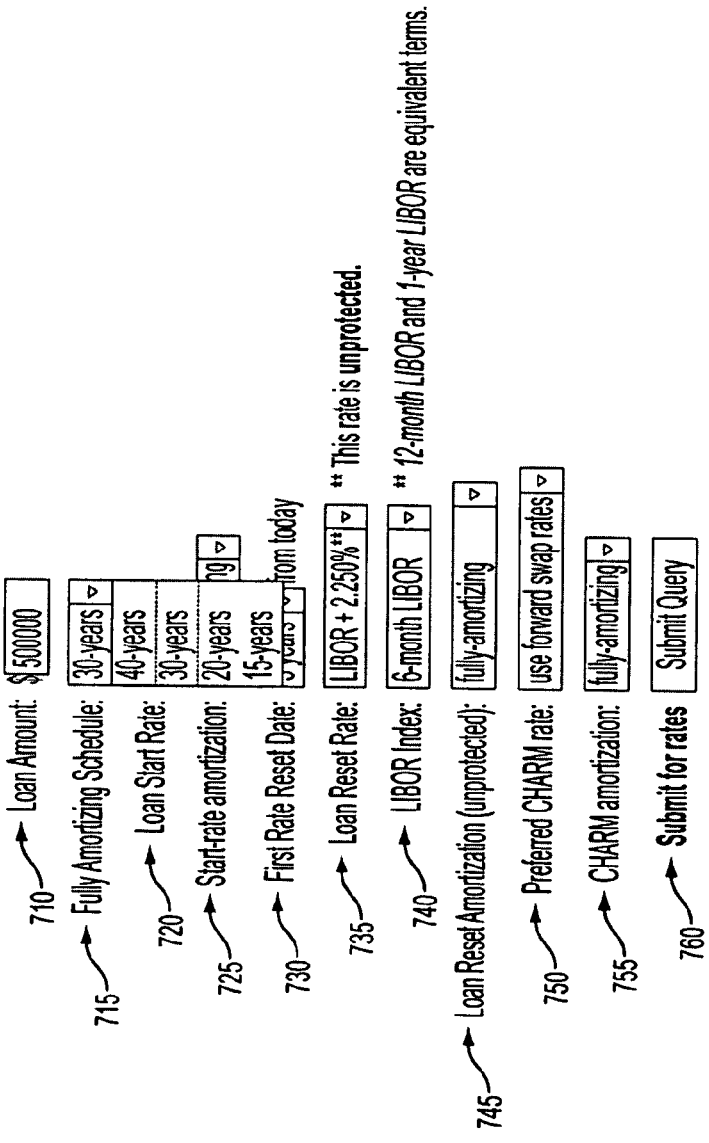

Referring to FIG. 7, in some embodiments, the user entering text in a field box for loan amount 710 (e.g., 500,000) is illustratively displayed. Also, the user selecting alternatives from pull down menus corresponding with variations (e.g., fully amortized schedule 715, loan start rate 720, start-rate amortization 725, first rate reset date 730, loan reset rate 735, LIBOR index 740, loan reset amortization (unprotected) 745, preferred CHARM rate 750, CHARM amortization 755) is illustratively displayed.

In some instances, numerous alternatives may exist for a variation. For example, as shown in FIG. 7, the user may select the alternative 30-years from a pull down menu corresponding with the variation fully amortizing schedule 715. Fully amortizing schedule 715 may refer to the maximum length of time for completing payments on the CHARM mortgage.

Referring to FIG. 8, in some embodiments, the loan start rate 720 for the CHARM mortgage may be modified. As shown, the user may select the pull down menu corresponding with loan start rate 720. In this example, the user selects the alternative 6.000%. Loan start rate 720 may range from 0% to 20% or any other suitable range. Loan start rate 720 may refer to the initial interest rate for the CHARM mortgage. In some instances, the initial interest rate may be substantially lower than later rates (e.g., teaser rates).

Referring to FIG. 9, in some embodiments, the initial rate or start rate may offer numerous amortization alternatives. As shown, the pull down menu corresponding with start-rate amortization 725 may be selected. Two variations are displayed, for example, fully-amortizing and interest-only. With fully-amortizing, some percentage of the loan payment may pay into the principal loan amount. With interest-only, no percentage of the loan payment may pay into the principal loan amount. As displayed, the user may select the variation fully-amortizing. In some instances, numerous alternatives or only one alternative may exist for variation start-rate amortization 725.

Referring to FIG. 10, in some embodiments, the duration of the first rate may be varied. First rate reset date 730 may refer to when loan start rate 720 is no longer fixed. As shown, the user may select the pull down menu corresponding with first rate reset date and chooses the variation 3 years. In this instance, for example, the initial rate of the loan (e.g., 6.000%) will remain fixed for 3 years for loan reset rate 735.

Referring to FIG. 11, in some embodiments, the interest rate may reset after the start rate concludes. In some instances, there are numerous options for the interest rate after the start rate. The rate after the start rate may be based off of LIBOR and some additional percentage rate or any other suitable basis. As shown, for example, the user may select LIBOR+ 2.250% for loan reset rate 735.

Referring to FIG. 12, in some embodiments, the amount of time used to determine the average interest rate may vary. For example, the loan reset rate may be based off of a LIBOR average over a given amount of time (e.g., 3, 6, and 12 months). As shown, the user may select variations of LIBOR index 740 using a pull down menu. In this example, the user selects 6 month LIBOR indicated that the loan reset rate will be based off of the LIBOR average for 6-month periods.

Referring to FIG. 13, in some embodiments, the loan extending after the initial rate may have various loan reset amortization 745 alternatives. Amortization alternatives may include options allowing the user to select a mortgage that fully amortizes over a given period of time or an alternative where the user only pays the interest on the loan for a given period of time. As shown, the user may select the pull down menu corresponding with loan reset amortization (unprotected) and select the alternative fully-amortizing.

Referring to FIG. 14, in some embodiments, the preferred CHARM rate 750 may be selected from a list. CHARM rates may be based off of interest rates (e.g. 6%, 6.125%, 6.250%, etc.) or other variations on the rate (e.g., forward swap rates). As shown, the user may select the alternative use forward swap rates from a pull down menu corresponding with the variation preferred CHARM rate 750.

Referring to FIG. 15, in some embodiments, CHARM amortization 755 may offer numerous alternatives. In some instances, CHARM amortization may be fully amortizing or interest only. As shown, the user may select a fully-amortizing CHARM.

Referring to FIG. 16, in some embodiments, a graphical representation of various rates and products may be produced based on input variations/alternatives. Further, in some embodiments, variations/alternatives may be modified to vary the graphical representations (i.e., modified in real time). For example, preferred lock-in rate 1620 may be modified (e.g., selecting alternatives, such as us forward swap rate, 6.000%, 6.125%, 6.25%, etc.) varying the graphical representation. As shown, entered data 1610 (i.e., alternatives/variations) may be displayed (e.g., lock-in protection start date: 37 months from today; loan amount: $500000; loan reset rate: 6 month LIBOR+2.25% original loan; fully amortizing schedule: 30-years; start rate amortization: fully-amortizing; protected amortization: fully-amortizing; loan balance on reset date: $480420). In some instances an up-front CHARM fee 1615 may be required. Up-front Charm fee 1615 may be based on charm variations (e.g., firm rate 1617, flex rate 1618, cap rate 1619, etc.). The duration lock may range (e.g., from 12 months to 84 months) affecting costs after the rate becomes variable and CHARM rates. For example, as shown the user may modify the preferred lock-in rate 1620. Modifying preferred lock in rate 1620, the preferred initial rate may be displayed in the graph with associated costs 1621. As shown, initial rate period 1622 displays the same rate for the first 36 months. Further, lock duration 1625 affects the various CHARM rates 1626. For example, selecting a lock duration of 48 months Charm Rate 1627 is set at an interest rate of 7.680%, costing the borrower $3,520 per month. In some instances, the longer the lock duration, the higher the interest rate and, accordingly, the higher the monthly payment. After the lock duration ends, the interest rates may float based on the user's previously input data (e.g., LIBOR+ 2.25%).

Referring to FIGS. 17-25, in some embodiments, the user may input additional variations for comparing and selecting the desired CHARM. For example, home value 1710 may be inputted (e.g., $750000). In some instances, prior to releasing CHARM rates, lenders may require home value 1710 to be indicated. Similar to FIGS. 7-16, the user may be required to enter numerous variations (e.g., fully amortized schedule 715, loan start rate 720, start-rate amortization 725, first rate reset date 730, loan reset rate 735, LIBOR index 740, loan reset amortization (unprotected) 745, preferred CHARM rate 750, CHARM amortization 755). Inputting the aforementioned variations is illustratively displayed in FIGS. 17-25.

Referring to FIGS. 26 and 27, in some embodiments, a graphical representation of various rates and products is produced based on input variations/alternatives including additional variations, such as home value 2713 (FIG. 27). Further, in some embodiments, variations/alternatives may be modified to vary the graphical representations (i.e., modified in real time). For example, preferred lock-in rate 2720 may be modified (e.g., selecting alternatives, such as us forward swap rate, 6.000%, 6.125%, 6.25%, etc.) varying the graphical representation. As shown, entered data 2710 (i.e., alternatives/variations) may be displayed (e.g., lock-in protection start date: 37 months from today; loan amount: $500000; home value: $750000; loan reset rate: 6 month LIBOR+ 2.25% original loan; fully amortizing schedule: 30-years; start rate amortization: fully-amortizing; protected amortization: fully-amortizing; loan balance on reset date: $480420). In some instances an up-front CHARM fee 2715 may be required. Up-front Charm fee 2715 may be based on charm variations (e.g., firm rate 2717, flex rate 2718, cap rate 2719, etc.). The duration lock may range (e.g., from 12 months to 84 months) affecting costs after the rate becomes variable. For example, as shown the user may modify the preferred lock-in rate 2720. Modifying preferred lock-in rate 2720, the preferred initial rate may be displayed in the graph with associated costs 2721. As shown, initial rate period 2721 displays the same rate for the first 36 months. Further, lock duration 2725 affects the various CHARM rates 2726. For example, after selecting a lock duration of 48 months, CHARM rate 2727 is set at a interest rate of 7.680%, thus costing the borrower $3,520 per month. In some instances, the longer the lock duration, the higher the interest rate and, accordingly, the higher the monthly payment. After the lock duration ends the interest rates may float based on the user's previously input data (e.g., LIBOR+2.25%).

Referring to FIGS. 28 and 29, in some embodiments, fees may be rolled into the loan. As shown in FIG. 28, for example, the user may select "roll fees into loan" box 2810. "Fees rolled in" may be presented graphically as illustrated in FIG. 29. Although not shown, in some instances, "display LTV when rolling in fees" box 2820 may be selected and a corresponding display presented similarly to that in FIG. 29. As shown in FIG. 29, in some instances a graph may be produced displaying the fees rolled into initial rate period 2910 and CHARM rate 2920.

Referring to FIGS. 30-32, a savings calculator may be used to display possible savings on the CHARM loan. In some instances, information provided in each of the variations may be automatically presented from information entered in previous screens. In other instances, the user must enter-in information. For comparison, the user may enter a number of scenarios (e.g., two or more). As shown in FIG. 30, the user may enter two scenarios. Numerous variations (e.g., loan amount 3005, scenario #2-fees rolled in 3010, loan start rate 3015, fixed rate period 3020, interest only period 3025, amortization period 3030, todays LIBOR index rate 3035, LIBOR loan margin 3040, scenario #1-unprotected assume LIBOR rises 3045, scenario #1-unprotected assume floating maximum effective retail rate 3050, scenario #1-start rate interest only period 3055, scenario #1-additional reset rate interest only period 3060, scenario #2-protected purchased protection lock/cap rate 3065, scenario #2-start rate interest only period 3070, scenario #2-additional reset rate interest only period 3075, analysis period 3080, etc.) may be required for comparison. Some variables may be universal to both scenarios (e.g., loan amount 3005) and some variables may be specific to each scenario (scenario #2-fees rolled in 3010 and scenario #1-unprotected assume LIBOR rises 3045). The variations inputted preferably provide enough information to create the initial unprotected and protected interest rate scenarios. When desired the user may select submit query 3095 to generate the display as in FIG. 32 or take the user to a second step as in FIG. 31.

Referring to FIG. 31, in some embodiments, the user may change the interest rates on a year-to-year basis and see how it effects the loan payments, total interest, and principal paid. For example, two scenarios may be compared over various time spans 3110 (e.g., 1-12, 13-24, 35-36, 37-48, 49-60) and various interest rates 3120 may be input for each of the time spans.

Referring to FIG. 32, in some embodiments, a savings calculator may graphically display a comparison of scenarios and the accumulated benefits. This display may include various details of the loans in the scenarios and a hedge. For example, as shown, two scenarios may be compared based on input information displayed in FIGS. 30 and 31. The savings calculator display may indicate the difference 3202 in total interest paid 3203 and loan balance 3204 between scenario 1 3200 and scenario 2 3201. Further, the savings calculator may indicate the CHARM up-front fee 3205 based on numerous variations (e.g., firm, flex, cap). As shown, for both scenario 1 and scenario 2, relevant information input by the user and the computer may be displayed (e.g., month 3210, rate 3220, balance 3230, payment 3240, interest 3250, principle reduction 3260, rate 3212, balance 3214, payment 3216, interest 3218, principle reduction 3222). The display may also indicate the cash flow savings 3270 and equity advantage 3280 between the two scenarios at various months 3210 based on various rates 3220. Calculators such as this may be utilized by the user or lender in determining which scenario is the best for their needs.

The display illustrated in FIG. 32 may be generated in any suitable manner. For example, the display may be generated using the techniques described above, for example in connection with the discussion of FIG. 5, to calculate the costs for providing a hedge in connection with a mortgage. Based upon the variables entered in connection with an interface like that in FIG. 30, the display may then reflect how the two scenarios are impacted by the hedge and its associated costs.

FIGS. 33-35 illustrate various forms of adjustable rate mortgages that may be provided in accordance with various embodiments of the invention. Referring to FIG. 33, in some embodiments, the index rate for an ARM is determined at an agreed-to time prior to the new rate adjustment. The agreed-to time may be contractually established prior to initiating the loan. For example, a 5/1 ARM (i.e., the index rate is fixed for the first five years and then the rate adjusts each year after that) with a 12-month rollback indicates that the index rate from 12 months earlier (i.e., the rollback period) may be used to calculate each new rate adjustment. Similar to a standard 5/1 ARM, the loan begins at origination period 3350 (i.e., the beginning of the loan). The first five years 3310 of the loan are at a fixed rate and then, for the duration of the loan after 3320, the rate is variable. In this example, the new rate adjustment for the $61^{st}$ month 3330 may be based on the index rate for the $49^{th}$ month 3340 of the loan. Similarly, the new rate adjustment for the $73^{rd}$ month 3360 may be calculated based on the index rate for the $61^{st}$ month 3330 of the loan. This may continue on for the duration of the loan or until stopped, when permitted, by the lender or the borrower. Selecting the index rate based on an index rate from a past point in time may be referred to as a "rollback." It will be apparent that, if interest rates are rising, the rollback benefits the borrower, and, if interest rates are falling, the rollback benefits the lender.

Referring to FIG. 34, in some embodiments, the new index rate adjustment for the ARM may be selected by the lender (i.e., a lender preference) from an index rate from an agreed-upon period of time. The rollback period and the duration of time the lender has to select the new interest rate may be contractually established. For example, a 5/1 ARM with a 12-month rollback and a lender preference of two months may be used to calculate the new rate adjustment. That is, the 5/1 ARM with a 12-month rollback may begin at origination period 3450. The first five years 3410 of the loan are at a fixed rate and, then, for the duration of the loan 3420, the rate is variable. During the variable period, the interest rate changes every 12 months. In this example, the new rate adjustment is based on the index rate 12 months earlier and the lender has the option of calculating the new rate adjustment based on the index rates for the first two months of the previous cycle. In other instances the lender may be able to select between more than two index rates from the previous cycle. Also, in other instances, the lender may be able to select between more than one index rate at various predetermined times (e.g., the end of each quarter) in the previous cycle. Using a rollback with lender preference allows the borrower to gain from the lower past rate while still allowing the lender to select the higher of multiple index rates.

In some instances, rollback with automatic cancellation allows the lender to automatically cancel the rollback if the index rate for the new rate adjustment period (i.e., when the interest rate is set to adjust) is lower than the index rate for the rollback month. For example, the index rate at month 61 may be lower than the index rate at month 49. In that instance, the lender may automatically cancel calculating the loan based on the index rate at month 49 and select the interest rate at month 61. In some instances this may terminate all future rollback benefits. Further, in some instances, the customer may be required to request cancellation of the new rate adjustment being calculated on the rollback period and may have the new rate adjustment calculated on the new rate adjustment month. Further, a window of time may be contractually provided limiting the amount of time the customer has to contact the lender to make such a request.

In some instances, using a rollback index cap, an interest rate cap may be set based on the index rate for a rollback month. Further, the borrower may have the option to set a cap at the present interest rate for the loan. That is, the borrower may have the option of choosing the lower of two index rates: the rollback index rate and the present index rate. In some instances, when a user selects between a present index rate and a rollback index rate, the user may be required to pay a switching fee. Further, in some instances, the rollback index rate that the lender may select from may have a range of index periods. In this instance, the lender may gain the benefit of choosing the higher index rate and the borrower may gain the benefit of selecting between the lower index rate (i.e., the rollback rate and the present rate).

It will be apparent that the rollback lending techniques provide the borrower and/or the lender with the ability to get a "second chance" on the market. There are numerous benefits for utilizing a rollback lending product, such as enabling a mutually beneficial hedge trade between consumers who may fear upward interest rate adjustments and a marketplace of investors who may appear to believe that interest rates may stay flat or decline (e.g., in cases where the yield curve is flat). Rollback lending products exploit synergies in labor costs and consumer value by bundling advance notice of rates with an adjustment to rates. Further, rollback lending products may lead to better borrower behavior such as a lower default or bankruptcy rate. Also, more predictable behavior of prepayment in mortgage pools may follow from better consumer expectations about future loan interest rates. Rollback lending products may identify a group of borrowers who would be willing to pay to have a bit of additional notice and protection built into their adjustable rate mortgage. Such a group is worthy of further study in terms of credit risk and other behavior from a credit or a marketing perspective. Rollback lending creates focus points for bank to market other refinance products to borrowers.

Numerous factors may be utilizing to determine the cost of rollback lending products. For example, flatness of the yield curve lowers costs, steepness of the yield curve raises costs, and calculating the cost of the simplest rollbacks directly from differences in implied forward rates may be used to determine the costs of rollback lending. Further, interest rate volatility raises costs for caps and cancelable products while interest rate volatility lowers costs in products with lender preference. Volatility may have little-to-no effect on the cost of products that do not have a better-of or worse-of feature. Also, a high probability of customer refinance and/or customer attrition may lower costs of the rollback products. The mark-up gap between ARM fixed rates and ARM floating rates may be a large contributor to customer refinance. Regulations in some states may require all products to have a "cap"-like feature to restore the original ARM rate formula upon request by the borrower. Many sub-prime loans attempt to lock borrowers into very high rates knowing that they will try to refinance in a short period once actually faced with the higher payments. If the speed of refinancing speeds up or increases refinance activity and moves borrowers away from high interest rate loans, then some lenders or investors may wish to include this potential effect as a cost of offering this product to their borrowers.

Referring to FIG. 35 a hypothetical scenario displays the benefits/detriments of a rollback loan product in accordance with certain embodiments. Timeline 3510 displays the loan at various times (i.e., origination 3520, year 4 3530, and year 5 3540). The general loan type addressed in this example is a 5/1 ARM with a rollback. It will be apparent that other forms of loans (e.g., 10/1 ARM, 7/1 ARM, Interest Only Loans, etc.) may utilize a rollback. In this example, at origination, the loan information 3550 indicates that LIBOR is at 5.8%, the 5/1 ARM rate is at 7.5%, the initial cap is at 6%, the periodic cap is at 2%, and the lifetime cap is at 6%. The loan information provided at origination describes three separate economic scenarios (i.e., inflation 3555, flat 3560, recession 3565). At year 4, in the inflation scenario, loan information 3570 indicates that LIBOR is at 12% and the loan rate is at 13.5% in year 5. Under the inflation scenario at year 5, loan information 3575 indicates that new 5/1 ARM loans are at 14%. Thus, all users would engage the rollback as the loan rate at year 4 was 13.5%. In the flat scenario at year 4, loan information 3580 indicates that LIBOR is at 7% and the loan rate is at 12% in year 5. Under the flat scenario at year 5, loan information 3585 indicates that new 5/1 ARM loans are at 10%. Thus, an estimated 50% of borrowers refinance and 50% use rollback. In the recession scenario at year 4, loan information 3590 indicates that LIBOR is at 3% and the loan rate is at 8% in year 5. Under the recession scenario at year 5, loan information 3955 indicates that new 5/1 ARM loans are at 4.75%. Thus, it is estimated, that 80% of borrowers would refinance and 20% would use rollback.

In some instances, the rollback CHARMs are assigned a catalog number. For example, a CHARM may be assigned a 5-digit catalog number such as 52403. The first digit or digits of the catalog may be used to indicate that catalog item is a CHARM (e.g., 5). The next two digits may indicate the duration of the CHARM protection in months (e.g., 24). The remaining digits may indicate the CHARM parameter, such as 3 months for rollback (e.g., 03). It will be apparent that although the numbers in this example appear in specific sequence in other instances the sequence may be different. For example, a 5-digit catalog number may start with 24 indicating the duration of the CHARM protection in months.

In some instances, the average costs of the CHARM may be estimated. Costs may be calculated as the average discounted net payout for the CHARM feature. Further, cost may be calculated from model interest rate paths (e.g., 1,000 Black's model interest rate paths) of a given duration (e.g., 360-months). Each model interest rate path may start at an index rate (e.g., LIBOR equal to 5.54%). A slight negative drift may then be applied (e.g., −0.07 bp/month) and a log-normal volatility may be applied (e.g., 4.91% per month).

Utilizing estimates of the average cost of a CHARM can be inaccurate in at least two ways. First, the simulation may create a distribution of values from which averages or other statistics are calculated. The realization may select a single value, which will depend on actual real-world events. There is no reason that the average has to correspond to a likely real world value. Second, the accuracy of the calculation may increase as the number of paths is increased. For example, the accuracy for 1,000 paths may be about +/−20%, the accuracy for 4,000 paths may be about +/−10%, and the accuracy for 100,000 paths may be about +/−1%. The accuracy may improve with better models of interest rates and current practice in simulation variance reduction techniques such as the use of antithetical paths. This information implies that the lowest probability events (e.g., old RIC caps at 12%, etc.) are more likely to be a bit off than higher probability events (e.g., old RIC caps at 8%).

It is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

Although the present invention has been described and illustrated in the foregoing illustrative embodiments, it is understood that the present disclosure has been made only by way of example, and that numerous changes in the details of implementation of the invention may be made without departing from the spirit and scope of the invention.

What is claimed is:

1. A method for determining costs associated with providing a hedge for a residential mortgage which has an adjustable interest rate for at least a future, post-closing portion of the term of the mortgage, comprising:
   receiving from a user variables defining the residential mortgage and the hedge to be applied to the residential mortgage;
   determining, using a computer programmed to do so, an initial rate for a post-closing initial rate period that is associated with the residential mortgage;
   displaying on a display to the user the initial rate;
   displaying a plurality of monthly payment amounts for the initial rate period, wherein each of the plurality of monthly payment amounts for the initial rate period corresponds to a different type of hedge; and
   for each of a plurality of predetermined lock-duration periods of the at least a future, post-closing portion of the term of the residential mortgage:
      determining, using a computer programmed to do so a lock-duration rate that applies for the predetermined lock-duration period and that is different than other lock-duration rates for other of the plurality of predetermined lock-duration periods;
      displaying on the display the lock-duration rate;
      displaying a plurality of monthly payment amounts for the predetermined lock-duration period, wherein each of the plurality of monthly payment amounts for the predetermined lock-duration period corresponds to a different type of hedge;
      calculating, using a computer programmed to do so, a plurality of up-front fees associated with the hedge based on the sum of a plurality of products of interest rate reductions from potential market rates to the lock-duration rate that applies for the predetermined lock-duration period and probabilities of the occurrence of the interest rate reductions, wherein each of the plurality of up-front fees corresponds to a different type of hedge; and
      displaying to the user the plurality of up-front fees.

2. The method of claim 1, wherein one of the variables is a loan amount.

3. The method of claim 1, wherein one of the variables is a loan start rate.

4. The method of claim 1, wherein one of the variables is a fixed rate period.

5. The method of claim 1, wherein one of the variables is an unprotected rate.

6. The method of claim 1, wherein one of the variables is a protected rate.

7. The method of claim 1, further comprising receiving an indicator indicating whether the hedge is fully-amortizing.

8. A computer-readable medium encoded with computer-executable instructions that, when executed by a computer, cause the processor to perform a method for determining costs associated with providing a hedge for a residential mortgage which has an adjustable interest rate for at least a future, post-closing portion of the term of the mortgage, comprising:
   receiving from a user variables defining the residential mortgage and the hedge to be applied to the residential mortgage;
   determining an initial rate for a post-closing initial rate period that is associated with the residential mortgage;
   displaying to the user the initial rate;
   displaying a plurality of monthly payment amounts for the initial rate period, wherein each of the plurality of monthly payment amounts for the initial rate period corresponds to a different type of hedge; and for each of a plurality of predetermined lock-duration periods of the at least a future, post-closing portion of the term of the residential mortgage:
  determining a lock-duration rate that applies for the lock-duration predetermined period and that is different than other lock-duration rates for other of the plurality of predetermined lock-duration periods;
  displaying the lock-duration rate;
  displaying a plurality of monthly payment amounts for the predetermined lock-duration period, wherein each of the plurality of monthly payment amounts for the predetermined lock-duration period corresponds to a different type of hedge;
  calculating a plurality of up-front fees associated with the hedge based on the sum of a plurality of products of interest rate reductions from potential market rates to the lock-duration rate that applies for the predetermined lock-duration period and probabilities of the occurrence of the interest rate reductions, wherein each of the plurality of up-front fees corresponds to a different type of hedge; and
  displaying to the user the plurality of up-front fees.

9. The computer-readable medium of claim 8, wherein one of the variables is a loan amount.

10. The computer-readable medium of claim 8, wherein one of the variables is a loan start rate.

11. The computer-readable medium of claim 8, wherein one of the variables is a fixed rate period.

12. The computer-readable medium of claim 8, wherein one of the variables is an unprotected rate.

13. The computer-readable medium of claim 8, wherein one of the variables is a protected rate.

14. The computer-readable medium of claim 8, the method further comprising receiving an indicator indicating whether the hedge is fully-amortizing.

15. A system for determining costs associated with providing a hedge for a residential mortgage which has an adjustable interest rate for at least a future, post-closing portion of the term of the mortgage, comprising:

a computer programmed to:
  receive from a user variables defining the residential mortgage and the hedge to be applied to the residential mortgage;
  determine an initial rate for a post-closing initial rate period that is associated with the residential mortgage; and
  for each of a plurality of predetermined lock-duration periods of the at least a future, post-closing portion of the term of the mortgage:
    determine a lock-duration rate that applies for the predetermined lock-duration period and that is different than other lock-duration rates for other of the plurality of predetermined lock-duration periods; and
    calculate a plurality of up-front fees associated with the hedge based on the sum of a plurality of products of interest rate reductions from potential market rates to the lock-duration rate that applies for the predetermined lock-duration period and probabilities of the occurrence of the interest rate reductions, wherein each of the plurality of upfront fees corresponds to a different type of hedge; and a display configured to:
  display to the user the initial rate;
  displaying a plurality of monthly payment amounts for the initial rate period, wherein each of the plurality of monthly payment amounts for the initial rate period corresponds to a different type of hedge; and
  for each of a plurality of predetermined lock-duration periods of the at least a future, post-closing portion of the term of the mortgage:
    display the lock-duration rate;
    displaying a plurality of monthly payment amounts for the predetermined lock-duration period, wherein each of the plurality of monthly payment amounts for the predetermined lock-duration period corresponds to a different type of hedge; and
    display to the user the up-front fee.

* * * * *